United States Patent
Han et al.

(10) Patent No.: US 12,366,676 B2
(45) Date of Patent: Jul. 22, 2025

(54) TARGET DELINEATION METHOD FOR DEEP PROSPECTING OF HYDROTHERMAL DEPOSIT CONTROLLED BY FAULT-FOLD STRUCTURE

(71) Applicant: Kunming University of Science and Technology, Yunnan (CN)

(72) Inventors: Runsheng Han, Yunnan (CN); Jianbiao Wu, Yunnan (CN); Yan Zhang, Yunnan (CN); Qing Chen, Yunnan (CN); Wenyao Li, Yunnan (CN); Zhonglin Guo, Yunnan (CN); Bangtao Sun, Yunnan (CN)

(73) Assignee: Kunming University of Science and Technology, Yunnan (CN)

( * ) Notice: Subject to any disclaimer, the term of this patent is extended or adjusted under 35 U.S.C. 154(b) by 0 days.

(21) Appl. No.: 19/001,954

(22) Filed: Dec. 26, 2024

(65) Prior Publication Data

US 2025/0216576 A1    Jul. 3, 2025

(30) Foreign Application Priority Data

Dec. 28, 2023   (CN) .......................... 202311830553.5

(51) Int. Cl.
   *G01V 9/00* (2006.01)
(52) U.S. Cl.
   CPC .................................. *G01V 9/005* (2013.01)
(58) Field of Classification Search
   CPC .................................................. G01V 9/005
   See application file for complete search history.

(56) References Cited

U.S. PATENT DOCUMENTS

2011/0077918 A1 * 3/2011 Mutlu ...................... G01V 9/00
                                                        703/2
2019/0187330 A1 * 6/2019 Mallet .................... G01V 20/00

FOREIGN PATENT DOCUMENTS

CN    109814172 B   * 11/2020
CN    115016015 A   *  9/2022

OTHER PUBLICATIONS

Zheng et al. "Axial primary halo characterization and deep orebody prediction in the Ashele copper-zinc deposit, Xinjiang, NW China" (Year: 2020).*

(Continued)

*Primary Examiner* — Eyob Hagos
(74) *Attorney, Agent, or Firm* — WCF IP

(57) ABSTRACT

Provided is a target delineation method for deep prospecting of a hydrothermal deposit controlled by a fault-fold structure, including: analyzing an echelon distribution of orebodies or mineralized bodies, and analyzing a mechanical mechanism of the ore-forming structure; determining a trend and a plunge of an overall principal compressive stress of the mining area, as well as trends and plunges of local principal compressive stresses at different locations of an anticline; revealing a control effect of the local principal compressive stress on formation of an ore-bearing space and on a spatial distribution of orebody groups; and determining a stress transformation region controlled by the deposit structure as a favorable ore-forming zone of the deposit, and determining a stress transformation region controlled by an orebody structure in the favorable ore-forming zone as a target position for deep concealed orebodies.

3 Claims, 30 Drawing Sheets

(56) References Cited

OTHER PUBLICATIONS

Xue J L , Pang Z S , Cheng Z Z, Chen H, Jia R Y . Basic problems and methods of deep mineral exploration . Geological Bulletin of China , 2020 , 39( 8) : 1125-1136.

Theory and Methods of Ore Field Geomechanics / Authored by Sun Jiacong and Han Runsheng.—Beijing: Science Press, 2016 (Series on Metallogenic Regularities and Ore Prospecting Predictions of Typical Ore Deposits in Southwest China).

Li Siguang, "Geomechanical Methods", Beijing: Science Press, 1976.

Li Siguang, "An Introduction to Geomechanics", Beijing: Science Press, 1979.

D. Delvaux & B. Sperner, New aspects of tectonic stress inversion with reference to the TENSOR program, Geological Society, London, Special Publications, vol. 212, 2003.

CNIPA, Office Action, Application No. 202311830553.5, Sep. 5, 2024.

* cited by examiner $\sigma_1$:23/321
$\sigma_2$:29/064
$\sigma_3$:52/199
AD:17.1
N:5 c $\sigma_1$:29/153
$\sigma_2$:04/246
$\sigma_3$:61/343
AD:41.4
N:5 d $\sigma_1$:19/148
$\sigma_2$:58/272
$\sigma_3$:25/049
AD:0.2
N:1

$\sigma_1$:31/316
$\sigma_2$:22/061
$\sigma_3$:50/180
AD:5.7
N:2

$\sigma_1$:35/135
$\sigma_2$:44/003
$\sigma_3$:26/245
AD:31.5
N:6 i $\sigma_1$:00/137
$\sigma_2$:68/047
$\sigma_3$:22/227
AD:25.9
N:11 j $\sigma_1$:08/164
$\sigma_2$:00/074
$\sigma_3$:82/344
AD:2.9
N:2 k $\sigma_1$:19/154
$\sigma_2$:57/032
$\sigma_3$:26/253
AD:32.7
N:9 l $\sigma_1$: 30/155
$\sigma_2$: 30/045
$\sigma_3$: 45/280
AD: 18.8
N: 5 m $\sigma_1$: 02/151
$\sigma_2$: 40/059
$\sigma_3$: 50/244
AD: 27.1
N: 7 n $\sigma_1$:01/151
$\sigma_2$:10/060
$\sigma_3$:80/246
AD:40.7
N:6 o $\sigma_1$:05/034
$\sigma_2$:85/294
$\sigma_3$:25/126
AD:10.6
N:3 p $\sigma_1$:23/043
$\sigma_2$:30/299
$\sigma_3$:50/164
AD:14
N:5 q $\sigma_1$:07/332
$\sigma_2$:38/068
$\sigma_3$:54/234
AD:24
N:11 r

NW trend of the interlayer fault at the NW flank of the anticline
NW ⇌ SE

SE trend of the interlayer fault at the NW flank of the anticline
NW ⇌ SE

SE trend of the interlayer fault at the SE flank of the anticline
NW ⇌ SE

TARGET DELINEATION METHOD FOR DEEP PROSPECTING OF HYDROTHERMAL DEPOSIT CONTROLLED BY FAULT-FOLD STRUCTURE

CROSS REFERENCE TO RELATED APPLICATION

This patent application claims the benefit and priority of Chinese Patent Application No. 202311830553.5, filed with the China National Intellectual Property Administration on Dec. 28, 2023, the disclosure of which is incorporated by reference herein in its entirety as part of the present application.

TECHNICAL FIELD

The present disclosure belongs to the field of mineral resource exploration, and relates to a target delineation method for deep prospecting of a hydrothermal deposit controlled by a fault-fold structure.

BACKGROUND

With the depletion of shallow mineral resources, there is an unmet demand for comprehensive, coordinated and sustainable development of the human society. Exploring control effects of deep processes on mineralization, and pioneering new deep prospecting spaces have become major scientific frontier problems in research of earth sciences at present. Deep prospecting with the enormous potential faces many difficulties (Xue Jianling et. al, 2020). In terms of geophysical exploration, the deep has the low resolution, the geological bodies in the shallow are interfered by many factors, the mines are strongly influenced by humanistic environments, and the qualitative and quantitative analysis on anomalies is difficult. In terms of chemical exploration, theories and methods for inferring deep geological structures with superficial chemical exploration information are not mature. In terms of drilling exploration, the verification on the deep is not cost-effective. However, the structures are the most direct factors for control of ore-forming geological bodies in hydrothermal deposits, and also the fundamental basis for interpretation of anomaly information in the geophysical exploration and chemical exploration, accurate arrangement of the drilling engineering, and delineation of prospecting targets. The hydrothermal deposits have characteristics of the complex ore-forming process, various ore-controlling factors, large-scale orebody shape, obvious grade change, etc. Almost all of the hydrothermal deposits are controlled by a fault and a fold in genetic connection with the fault, namely a fault-fold structure. However, the mechanical mechanism for controlling the anticline of the hydrothermal deposit, formation of the deposit and orebody distributions at different locations of the deposit remains unclear. This seriously restricts the deep orebody prediction and localization, and the deep prospecting.

SUMMARY

The present disclosure provides a target delineation method for deep prospecting of a hydrothermal deposit controlled by a fault-fold structure. The present disclosure provides a basis for prediction, research and exploration of the deep prospecting of the hydrothermal deposit controlled by the fault-fold structure.

The target delineation method for deep prospecting of a fault-fold structure controlled hydrothermal deposit specifically includes the following steps:

step (1): with the Theory and Method of Orefield Geomechanics, through structure measurement in plane and in profile, analyzing geometric, kinematic, mechanical, materiality, chronological, and dynamic characteristics of the fault-fold structure for controlling a mineralization zone in a mining area, and identifying types of ore-forming structures in the mining area; and analyzing spatial distribution characteristics of orebodies or mineralized bodies, analyzing and finding a structural hierarchal ore-controlling pattern in each of a deposit scale, an orebody scale, and an ore vein scale, determining an ore-controlling structure association style, dividing an ore-controlling tectonic system of the mining area, and constructing an ore-controlling pattern of the fault-fold structure, where the spatial distribution characteristics of the orebodies include an ore-bearing horizon, a spatial orientation, and an occurrence; and the occurrence includes a strike, a dip direction, a dip, and a pitch;

step (2): based on the ore-controlling pattern of the fault-fold structure in the step (1), and a revealed echelon distribution of known orebodies or mineralized bodies, analyzing a local stress field for controlling an ore-controlling structure of each of a single orebody and a single orebody group, thereby analyzing a mechanical mechanism of the ore-forming structure, where the echelon distribution of the orebodies or the mineralized bodies is as follows:

orebodies in an orebody group scale are distributed in a left echelon in plane; and in profile, orebodies in a northwest (NW)-trending northeast (NE)-southwest (SW)-striking sinistral torsional-compressional ore-bearing fault are distributed in a left lateral echelon, and orebodies in a southeast (SE)-trending NE-SW-striking sinistral torsional-compressional ore-bearing fault are distributed in a right lateral echelon;

the orebodies in the orebody group scale are distributed in the left echelon in plane; and in profile, orebodies in an SW-trending NW-SE-striking sinistral torsional-compressional ore-bearing fault are distributed in a left lateral echelon, and orebodies in an NE-trending NW-SE-striking sinistral torsional-compressional ore-bearing fault are distributed in a right lateral echelon;

the orebodies in the orebody group scale are distributed in the left echelon; and in profile, orebodies in a north (N)-trending east (E)-west (W)-striking sinistral torsional-compressional ore-bearing fault are distributed in a left lateral echelon, and orebodies in a south(S)-trending E-W-striking sinistral torsional-compressional ore-bearing fault are distributed in a right lateral echelon; and the orebodies in the orebody group scale are distributed in the left echelon in plane; and in profile, orebodies in a W-trending S-N-striking sinistral torsional-compressional ore-bearing fault are distributed in a left lateral echelon, and orebodies in an E-trending S-N-striking sinistral torsional-compressional ore-bearing fault are distributed in a right lateral echelon; and the mechanical mechanism of the ore-forming structure is as follows:

the orebody is controlled by a compressional-torsional plane in plane and in profile;

a long axis of the orebody is controlled by the compressional-torsional plane in plane and in profile; and a long axis of the orebody group, specifically a series connection plane of the orebodies, is controlled by a compressional-torsional plane in plane and in profile;

step (3): systematically classifying the ore-forming structures in the step (1) according to different locations and different elevations of an anticline, performing local principal compressive stress analysis with stress analysis software, and determining a trend and a plunge of a local principal compressive stress of an ore-controlling structure; and based on the ore-controlling pattern of the fault-fold structure, and in combination with regional tectonic evolution and the local principal compressive stress analysis, determining a trend and a plunge of an overall principal compressive stress of the mining area;

step (4): based on a principle of structural sequence transformation in the Theory and Method of Orefield Geomechanics, and the mechanical mechanism of the ore-forming structure in the step (2), and in combination with an analysis result and a change rule of the trend and the plunge of the local principal compressive stress in the step (3), analyzing mechanical properties of the ore-forming structure and a secondary structural plane of the ore-forming structure in profile by using a stress unit body, thereby revealing a control effect of the local principal compressive stress on formation of an ore-bearing space and on a spatial distribution of orebody groups;

step (5): based on an analysis result and a change rule of the trend and the plunge of the overall principal compressive stress, and the analysis result and the change rule of the trend and the plunge of the local principal compressive stress in the step (3), as well as the mechanical properties of the ore-forming structure and the secondary structural plane of the ore-forming structure in the profile in the step (4), and in combination with an occurrence of the ore-forming structure, analyzing different ore-forming rules at different locations of the anticline and control mechanisms of the different ore-forming rules; and step (6): in combination with the control effect of the local principal compressive stress on the formation of the ore-bearing space and on the spatial distribution of the orebody groups in the step (4), and the different ore-forming rules at the different locations of the anticline and the control mechanisms of the different ore-forming rules in the step (5), further revealing a mechanical mechanism of an ore-controlling structure at a favorable ore-forming location, determining a stress transformation region controlled by a deposit structure as a favorable ore-forming zone of the deposit, and determining a stress transformation region controlled by an orebody structure in the favorable ore-forming zone as a target position for concealed orebodies;

the stress transformation region of the deposit is determined as follows:

in profile, an anticlinal flank of the fault-fold structure is a relative stress compressing region, a hinge zone above a neutral plane is a stress extending region, and the stress transformation region is located between the relative stress compressing region and the stress extending region; and the stress transformation region of the orebody is determined as follows:

when a dip of an interlayer fault for controlling an orebody distribution becomes gentle, a region with an opposite direction of a local principal compressive stress and a decreased plunge is the stress transformation region of the orebodies, and is a favorable occurrence location for the orebodies and the mineralized bodies.

The present disclosure has the following advantages and technical effects:

(1) The method is applied to prediction and exploration in deep prospecting of the hydrothermal deposit containing various mineral species such as copper, plumbum (Pb), zinc (Zn), gold, antimony, and silver, and controlled by the fault-fold structure.

(2) The method quickly localizes the favorable ore-forming zone and the target position of the deep in the deposit scale and the orebody scale from the principle of mechanics, thereby greatly reducing the cost of analysis, test, measurement, and exploration.

(3) The method can further have a guiding role for engineering layout of the deep prospecting, and reduce the target verification cost.

(4) The method is simple and easy, and can obviously shorten the exploration period of the deep prospecting.

(5) The method obviously reduces influences of interference from abnormal factors in geophysical prospecting or chemical prospecting and influences of ambiguity, and can even provide an important basis for interpretation of anomalies in the geophysical prospecting or the chemical prospecting.

(6) The method is applied to the shallow brittle deformation domain with the scale of 1:1000 to 1:10000, and the investigation depth of 5 km.

BRIEF DESCRIPTION OF THE DRAWINGS

FIG. 2A illustrates an NW trend of an interlayer fault at an NW flank of the anticline, and FIG. 2B illustrates an SE trend of the interlayer fault at the NW flank of the anticline, 1: known orebody, 2: predicted orebody, P is a long axis of an orebody center, FIG. 2C is a compressional-torsional plane for controlling an orebody, and T is an extensional plane;

FIG. 4A to FIG. 4T are codes of the different locations of the anticline;

FIG. 5A to FIG. 5T are codes of the different locations of the anticline;

FIG. 7A illustrates a sequence transformation structural plane and a schematic kinematic view, FIG. 7B illustrates state analysis of a single principal compressive stress, FIG. 7C illustrates a corresponding relationship between a stress unit body and a stress ellipsoid, and FIG. 7D is a schematic view of the sequence transformation structural plane;

FIG. 9A illustrates the profile view in the genetic evolution of the ore-controlling mechanical mechanism, and FIG. 9B illustrates the relationship of the ore-controlling mechanical mechanism of the deposit structure, 1: known orebody, 2: predicted orebody, 3: stress transformation region, 4: ore-forming fluid, and 5: coal-bearing stratum.

DETAILED DESCRIPTION OF THE EMBODIMENTS

The present disclosure is further described below in detail with embodiments. However, the protection scope of the present disclosure is not limited to the content. The methods in the embodiment are all common methods unless otherwise specified.

Embodiment 1: Location and Prediction in Deep Prospecting of a Pb—Zn Deposit in Eastern Yunnan 1. Determination of a Spatial Distribution Pattern of Ore-Controlling Structures With the "Theory and Method of Orefield Geomechanics" (Sun Jiacong and Han Runsheng, 2016), profile measurement is performed on the earth's surface of the mining area and in the deep middle tunnels 910, 760, 683, 670, 610, 490, 430, 370 and 310, to analyze space geometric, kinematic, mechanical, materiality, chronological, and dynamic characteristics of an NE-trending fault structure, an S-N-trending fault structure, and an NNW-trending fault structure. An NE-trending MP sinistral compressional-torsional fault, an S-N-trending LZH sinistral torsional fault, an NE-trending MMS compound overturned anticline, an NNW-trending sinistral torsional-extensional fault, an NE-trending in-sequence sinistral compressional-torsional fault, and an NE-trending interlayer sinistral compressional-torsional fault zone are identified as ore-forming structures of the deposit. The NE-trending MP sinistral compressional-torsional fault serves as an ore-conducting structure. The S-N-trending LZH sinistral torsional fault, the NE-trending MMS compound overturned anticline, the NNW-trending sinistral torsional-extensional fault, and the NE-trending in-sequence sinistral compressional-torsional fault serve as an ore-blending structure. The NE-trending interlayer sinistral compressional-torsional fault zone serves as an ore-hosting structure.

Figure 1:
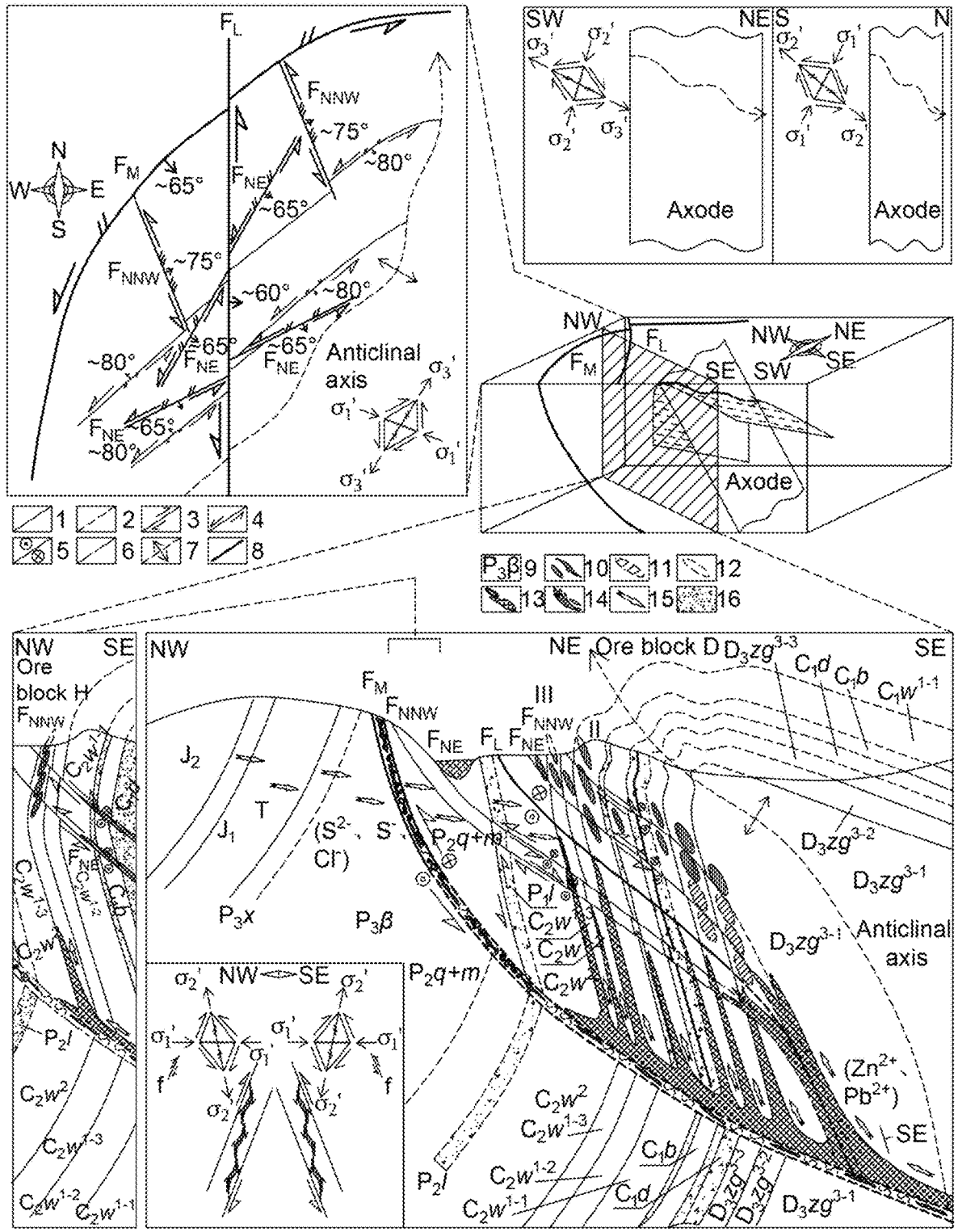
FIG. 1 illustrates an ore-controlling pattern of a structure of a Pb—Zn deposit in eastern Yunnan, where an upper left figure illustrates a structural hierarchical ore-controlling plane, an upper right figure illustrates a schematic view of an axode of an anticline and a three-dimensional (3D) view of the deposit, and a lower figure illustrates an ore-controlling pattern of an oblique thrust strike-slip fault-fold structure, 1: conformable contact, 2: disconformable contact, 3: compressional fault, 4: extensional fault, 5: torsional fault, 6: inferred fault, 7: anticline, 8: coal-bearing series, 9: stratum code, 10: known orebody, 11: predicted orebody, 12: denudated orebody, 13: dolomitization and its cemented limestone breccia, 14: ore-forming fluid, 15: reducing fluid, and 16: argillaceous and sandy clastic rock.

The deposit consists of four ore blocks. Based on the N—S-trending LZ river as a boundary, the ore block D is located in the east, and includes the No. I orebody group, the No. II orebody group, the No. III orebody group, and the No. IV orebody group. The ore block S, the ore block Q, and the ore block H are located in the west (FIG. 1). The orebodies are distributed in an interlayer fault zone at an NW flank of the MMS compound overturned anticline (FIG. 1). The stratum in the east is overturned, with an SE trend. For the stratum in the west, the shallow trends NW, and the deep trends SE. The orebodies are lenticular, vein-like and stratiform-like. For the ore block D, orebodies in the No. I orebody group come from an interlayer fault zone of the $D_3zg^{3-2}$ stratum, with an NE-SW strike, an SE dip direction, a dip of 60°-85°, and an SW pitch. Orebodies in the No. II orebody group and the No. III orebody group come from interlayer fault zones of the $C_1b$ and $C_2w^{1-2}$ strata, with an NE-SW strike, an SE dip direction, a dip of 60°-90° and an SW pitch. Orebodies in the No. VI orebody group come from the interlayer fault zone of the $D_3zg^{3-1}$ stratum, with an NE-SW strike, an SE dip direction, a dip of 50°-70° and an SW pitch. Orebodies of the ore block S, the ore block Q, and the ore block H in the west come from the interlayer fault zone of the $C_2w^{1-2}$ stratum, with an NE-SW strike, an NW dip direction, a dip of 70°-85°, an NE pitch for the middle and the shallow, and an SW pitch for the deep.

The structures of the deposit are classified into four grades. The NE-trending MP sinistral compressional-torsional fault and the S-N-trending LZH sinistral torsional fault are first-order structures, which jointly control a spatial distribution of the deposit together with the NE-trending MMS compound overturned anticline derived from the first-order structures and taken as a second-order structure of the deposit. The NNW-trending sinistral torsional-extensional fault and the NE-trending in-sequence sinistral compressional-torsional fault are second-order structures, which control a distribution of ore blocks and orebody groups. "Multilevel" NE-trending interlayer sinistral compressional-torsional fault zone and lower-order joint fissures are respectively taken as a third-order structure and a fourth-order structure of the deposit, which control the shape and occurrence of single orebodies, as well as a distribution of stockworks and veinlets.

The structural ore-controlling pattern in each of a deposit scale, an orebody scale, and an ore vein scale is as follows: an "oblique thrust strike-slip fault and compound anticline structure association" in the deposit scale; a "xi-type pattern", a "fault intersected pattern", and an "altered dolomite-clasolite covering pattern" in the orebody scale; and an interlayer fault zone, a thermally brecciated rock zone, and a joint fissure zone in the ore vein scale. The mining area mainly undergoes four development processes, including a middle-late Indosinian to early Yanshanian NE tectonic zone, an early and middle Yanshanian NW tectonic zone, a late Yanshanian SN tectonic zone, and a Himalayan EW tectonic zone. The middle-late Indosinian to early Yanshanian NE tectonic zone is a Pb—Zn ore-forming tectonic system, thereby constructing the ore-controlling pattern of the oblique thrust strike-slip fault-fold structure (FIG. 1).

Figure 2A:
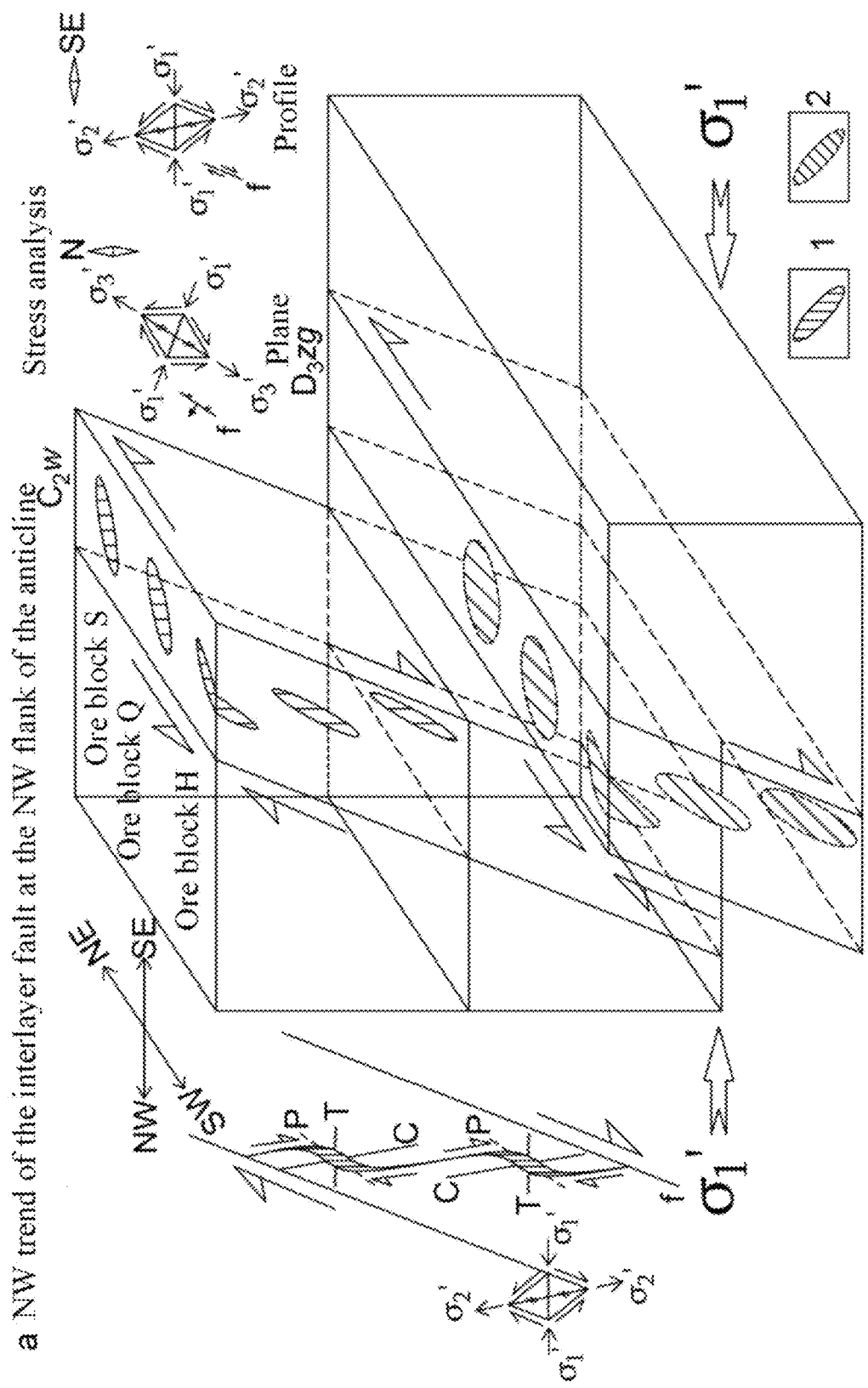
FIGS. 2A-2B illustrate spatial distributions of orebodies at different locations of an anticline of a Pb—Zn deposit in eastern Yunnan, where
Figure 2B:
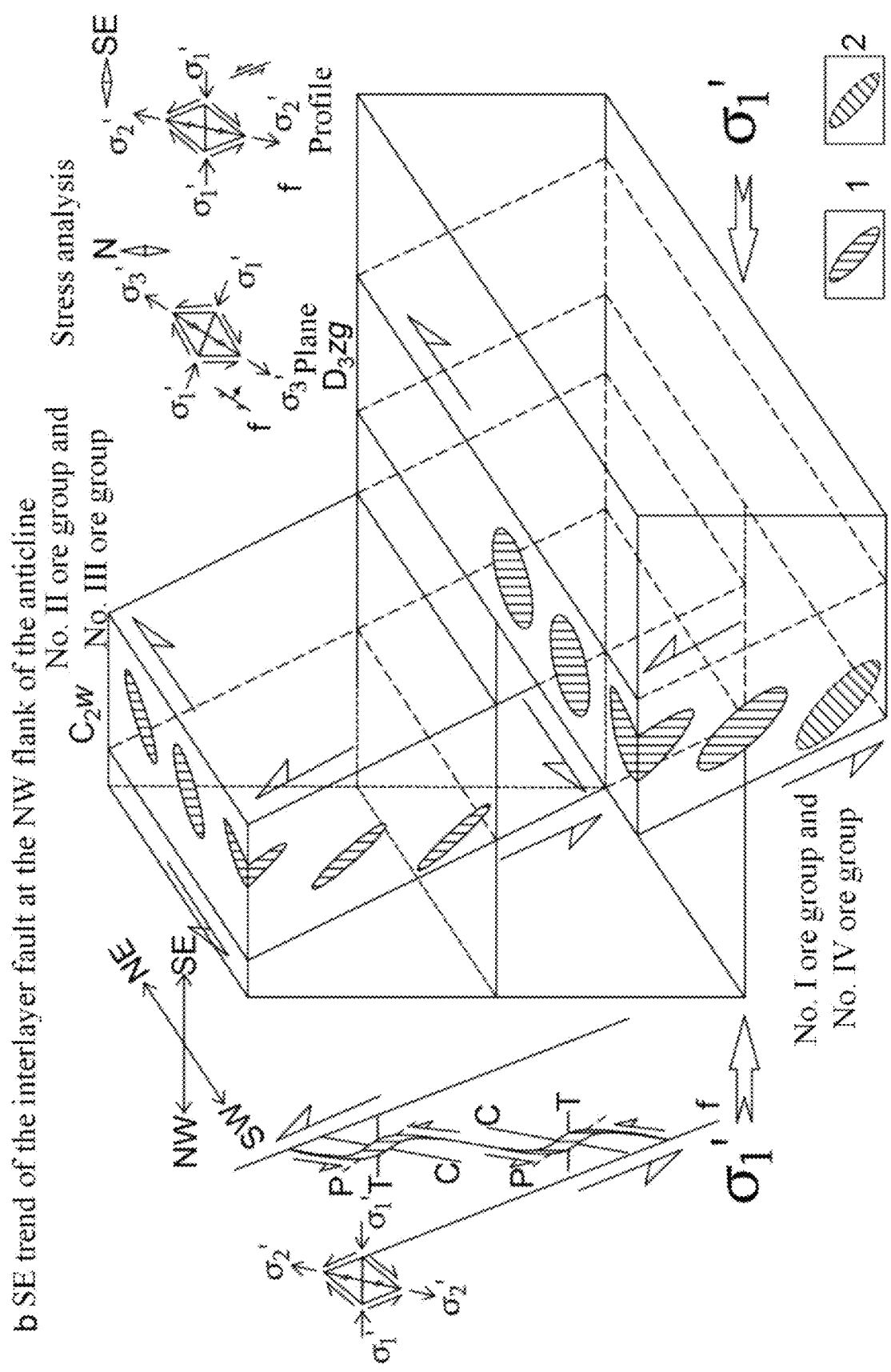

2. Identification of Spatial Distribution Rules and Mechanical Control Mechanisms of Orebodies To research an ore-controlling mechanical mechanism of the anticline, in addition to the fault structure, spatial distribution rules of orebodies at different locations of the anticline and relationships with the ore-controlling structures thereof are further to be researched systematically. According to the research, the orebodies are distributed in the interlayer fault at the NW flank of the anticline. With the shape and the occurrence affected by a mechanical action of the interlayer fault in the anticline under the stress, lenticular orebodies form an echelon-like orebody group with parallel compressional-torsional fractures. The echelon-like orebody group is "gentle-wide and steep-narrow" in profile, and is controlled by the compressional-torsional fracture in plane, resulting in that spatial distribution rules of orebodies at different locations are different (FIGS. 2A-2B): In the same interlayer fault zone, for the interlayer fault with an NW dip direction, the compressional-torsional plane (C) for controlling the orebodies is distributed in a right lateral echelon in profile, and a left echelon in plane; and a long axis (P) of the orebody is distributed in a left lateral echelon with a left dip direction in profile, and a left echelon in plane. For the interlayer fault with an SE dip direction, the compressional-torsional plane (C) for controlling the orebodies is distributed in a left lateral echelon in profile, and a left echelon in plane; and a long axis (P) of the orebody is distributed in a right lateral echelon with a right dip direction in profile, and a left echelon in plane.

Figure 3:
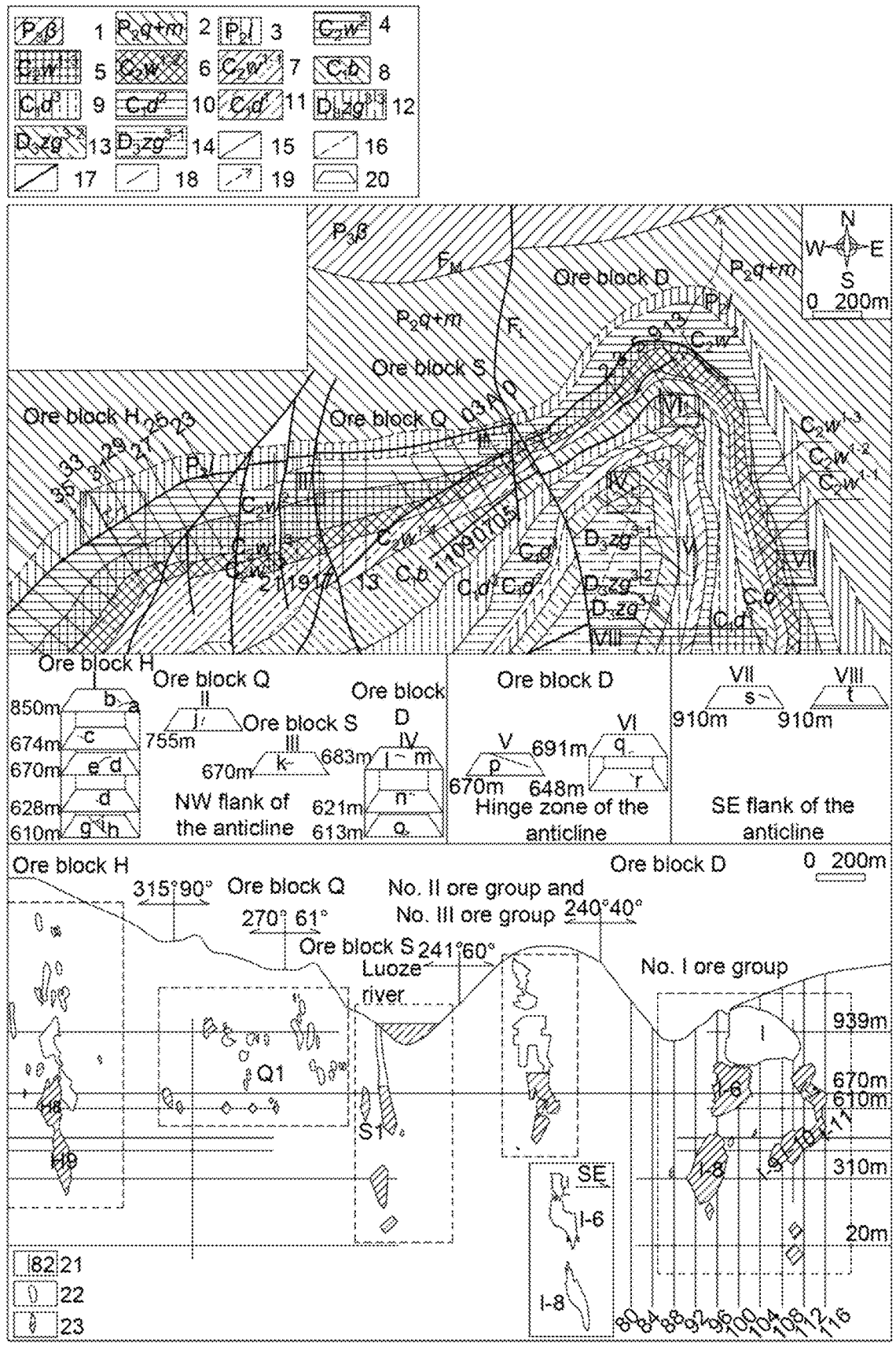
FIG. 3 illustrates planar projection (upper figure) of a geology of a Pb—Zn deposit in eastern Yunnan to an actual material and longitudinal projection of an orebody (lower figure), 1: upper Permian basalt formation, 2: middle Permian Qixia+Maokou formation, 3: lower Permian Liangshan formation, 4: middle Carboniferous Weining formation, 5: third section of a first layer of the middle Carboniferous Weining formation, 6: second section of the first layer of the middle Carboniferous Weining formation, 7: first section of the first layer of the middle Carboniferous Weining formation, 8: lower Carboniferous Baizuo formation, 9: third layer of a lower Carboniferous Datang formation, 10: second layer of the lower Carboniferous Datang formation, 11: first layer of the lower Carboniferous Datang formation, 12: third section of a third layer of an upper Devonian Zaige formation, 13: second section of the third layer of the upper Devonian Zaige formation, 14: first section of the third layer of the upper Devonian Zaige formation, 15: conformable contact of a stratum, 16: disconformable contact of the stratum, 17: fault, 18: planar projection position of a profile in research, 19: anticlinal axis, 20: research plane and geological profile, 21: exploration line and serial number, 22: mined-out orebody, and 23: known orebody.
Figure 4A:
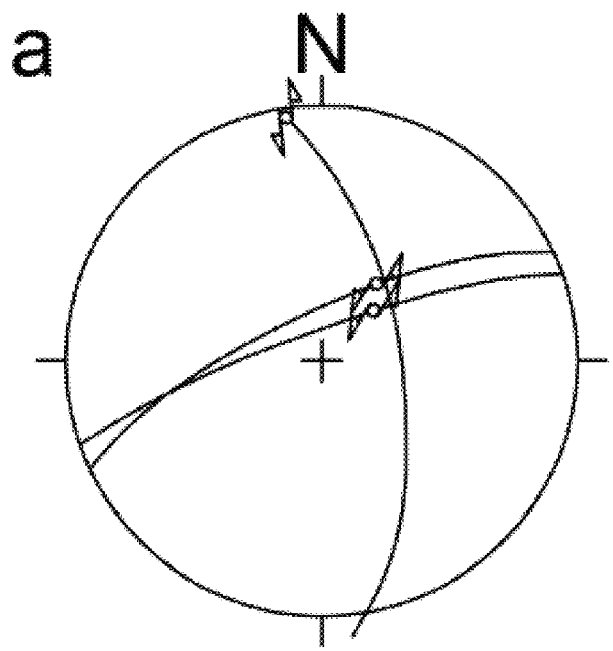
FIGS. 4A-4T illustrate stereographic projection for occurrence measurement results of ore-forming structures at different locations of an anticline of a Pb—Zn deposit in eastern Yunnan, where
Figure 4B:
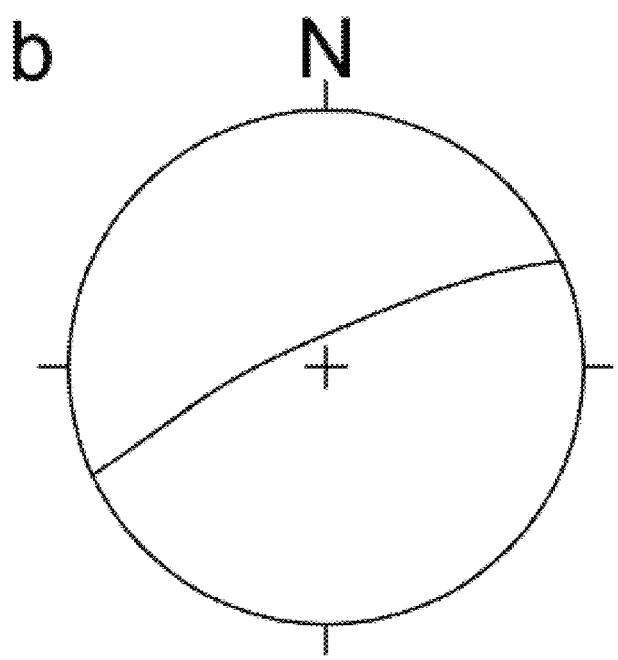
Figure 4C:
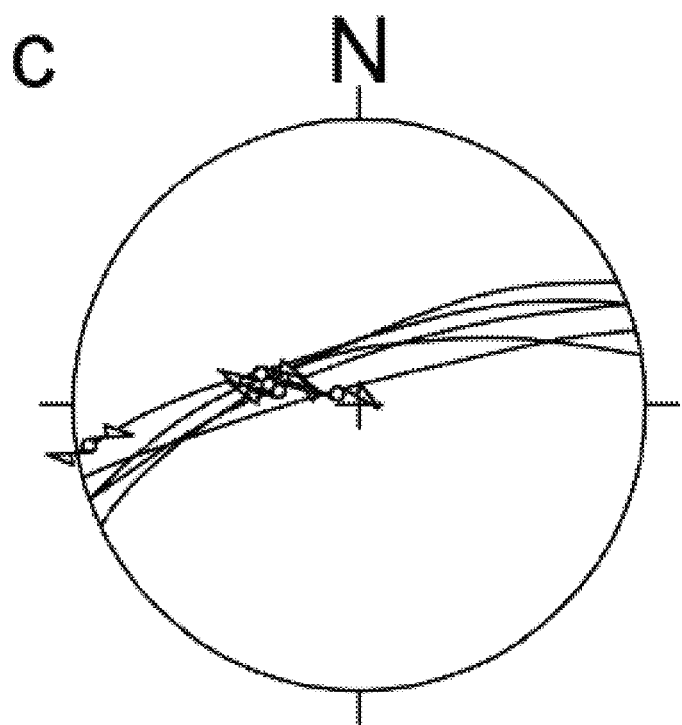
Figure 4D:
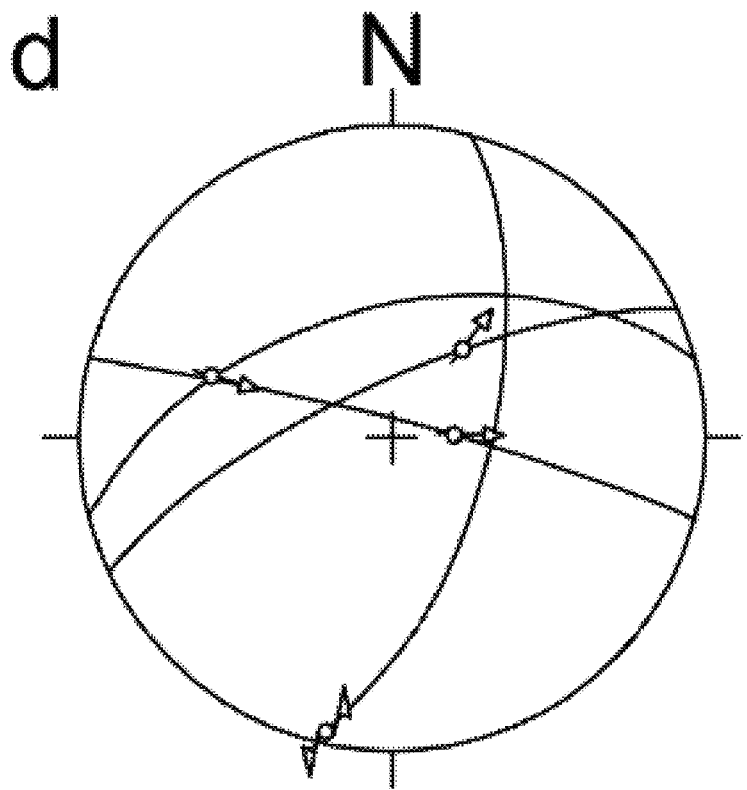
Figure 4E:
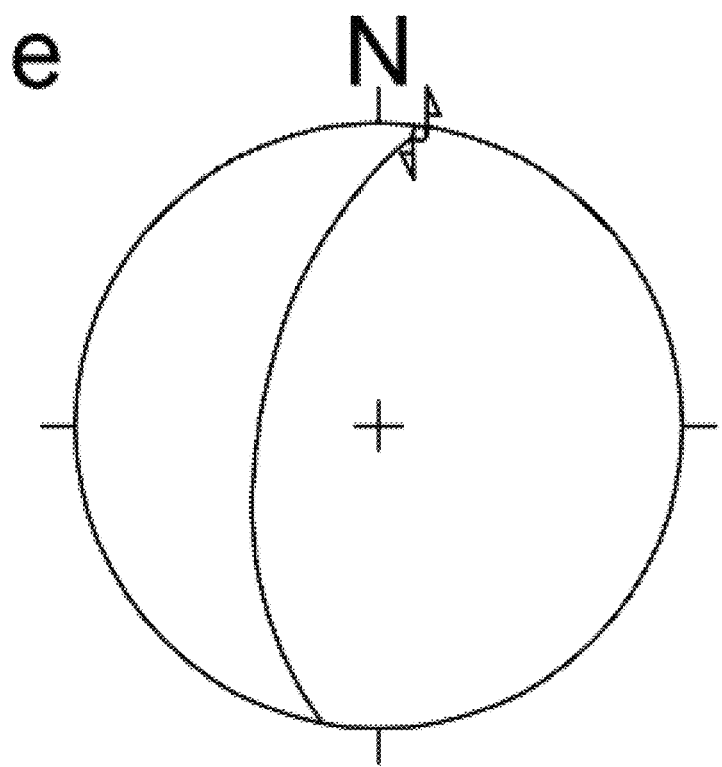
Figure 4F:
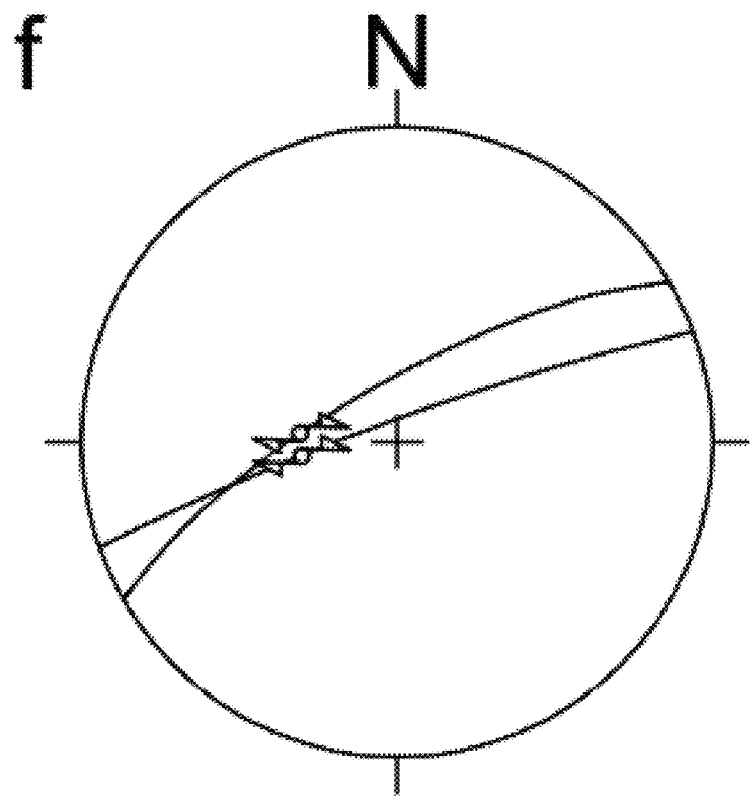
Figure 4G:
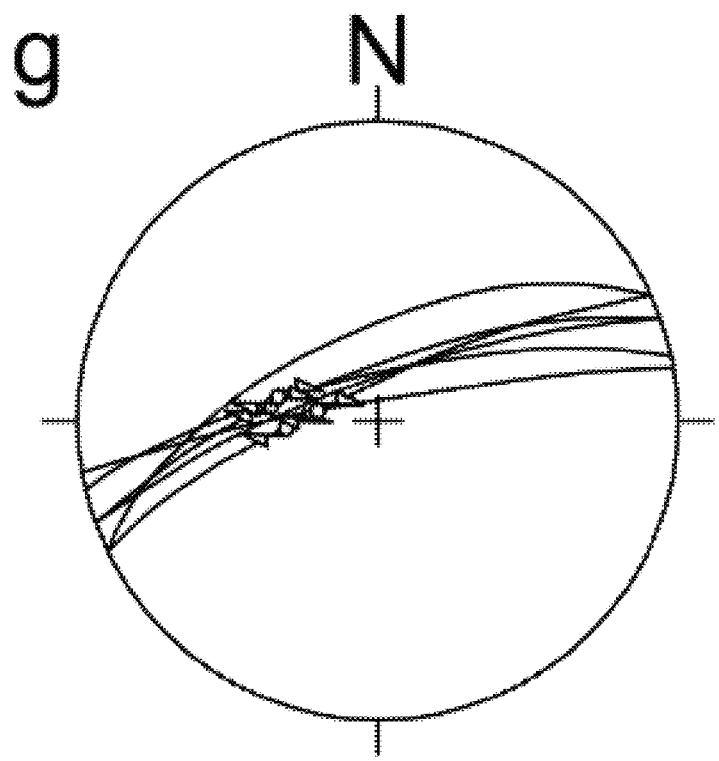
Figure 4H:
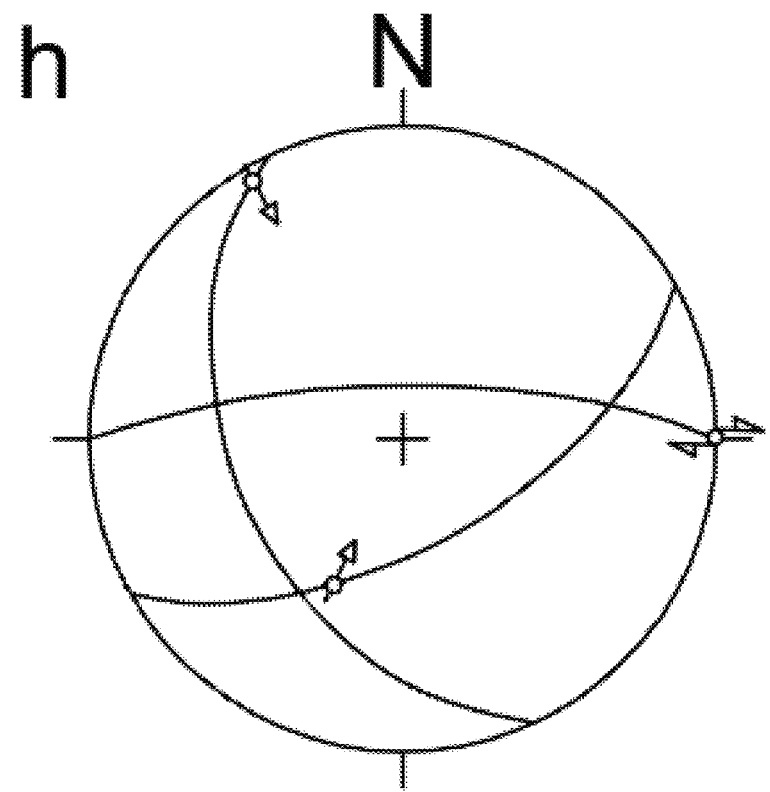
Figure 4I:
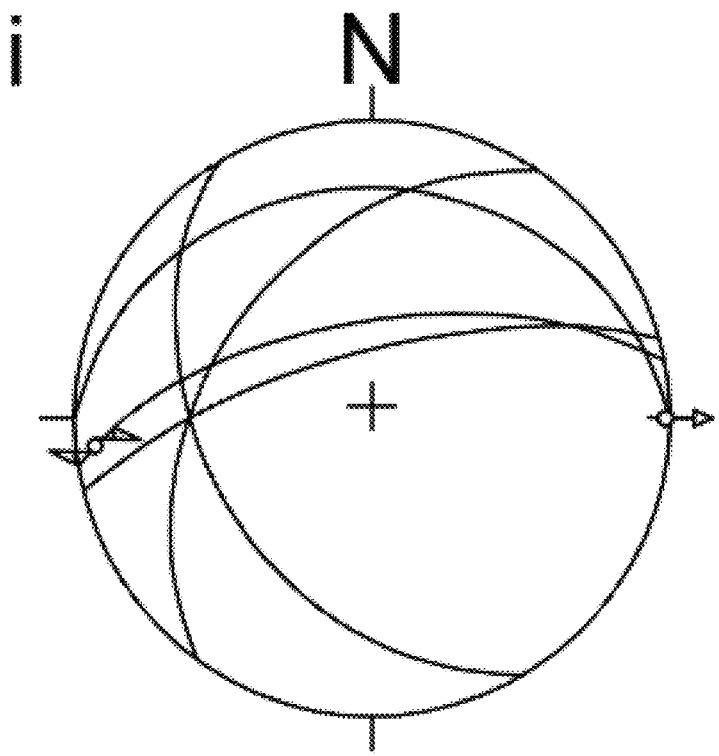
Figure 4J:
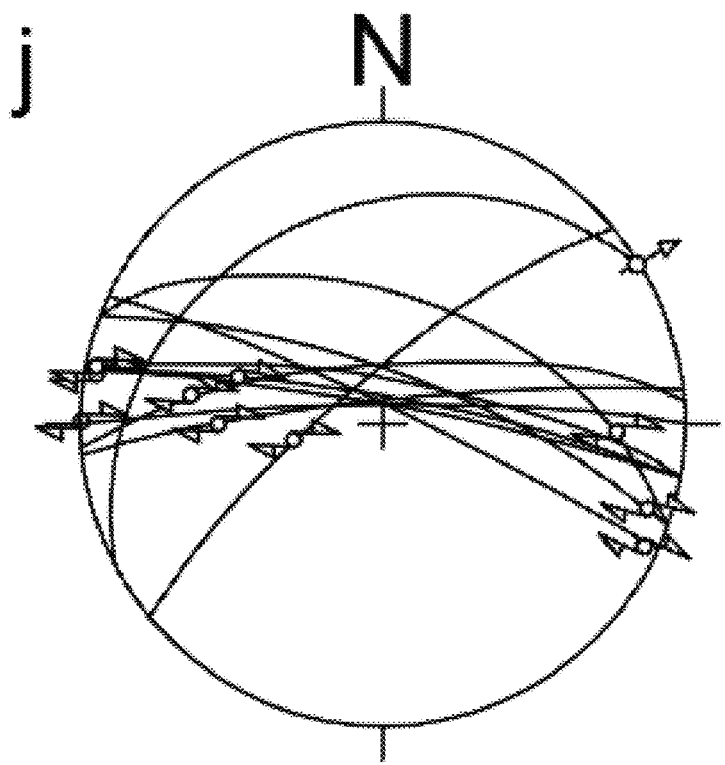
Figure 4K:
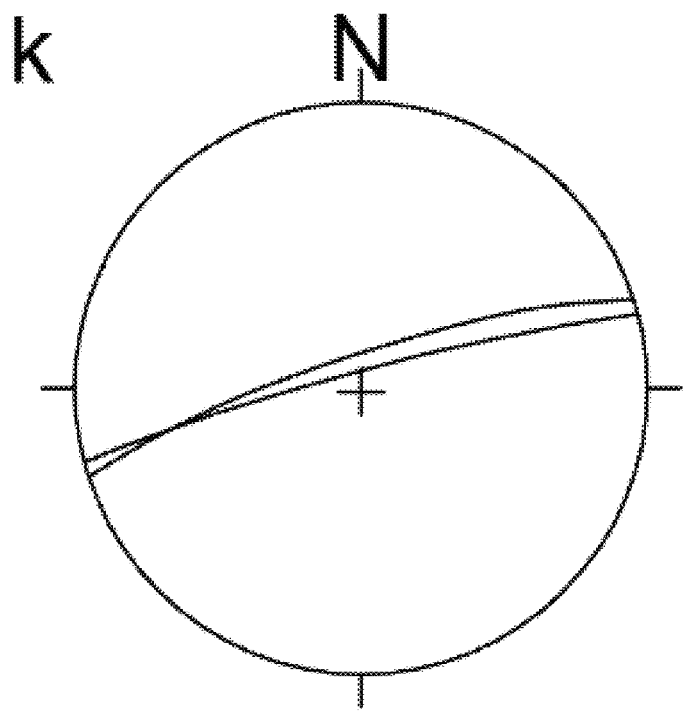
Figure 4L:
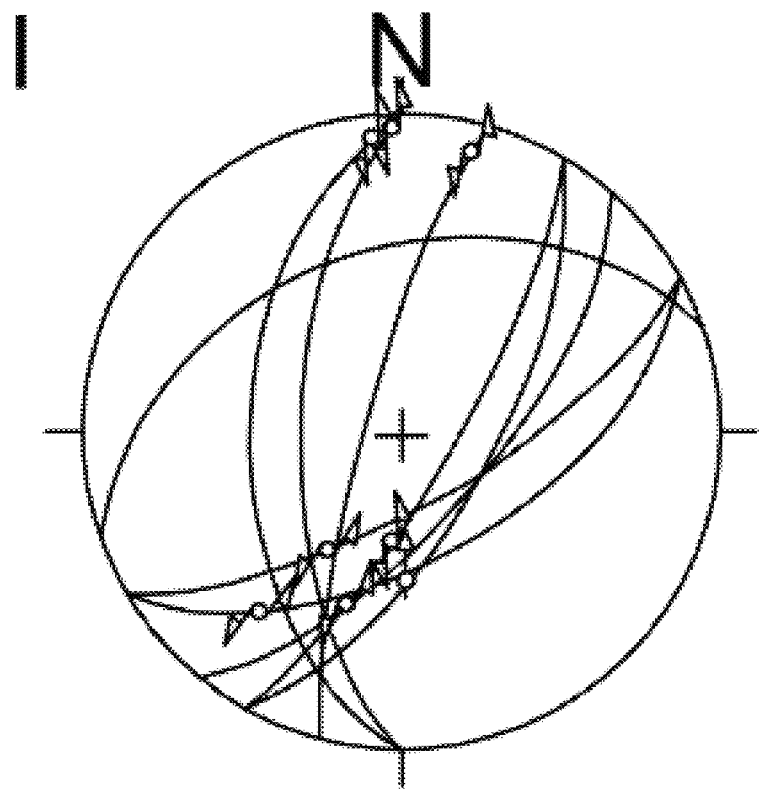
Figure 4M:
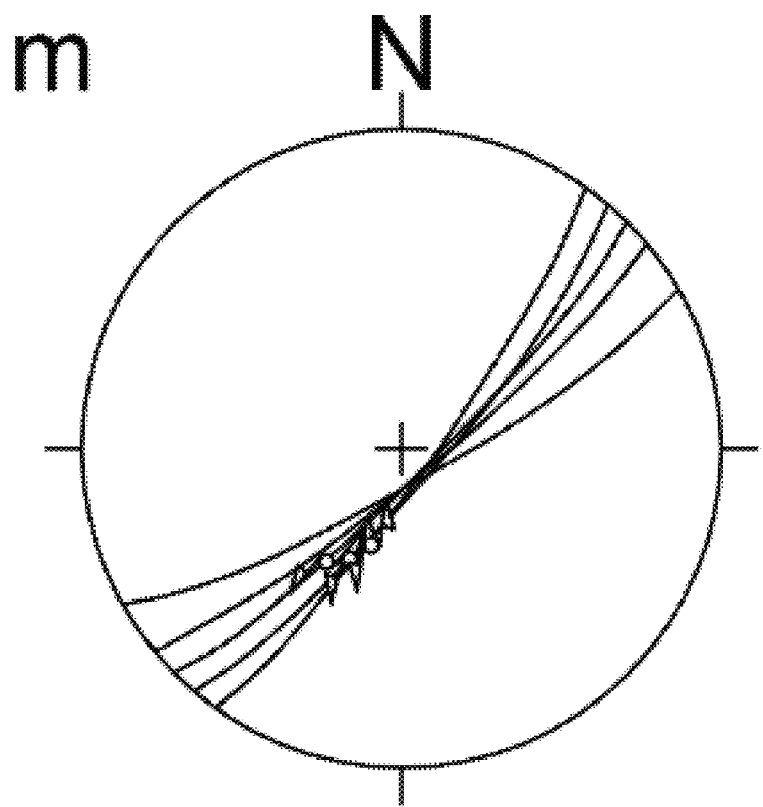
Figure 4N:
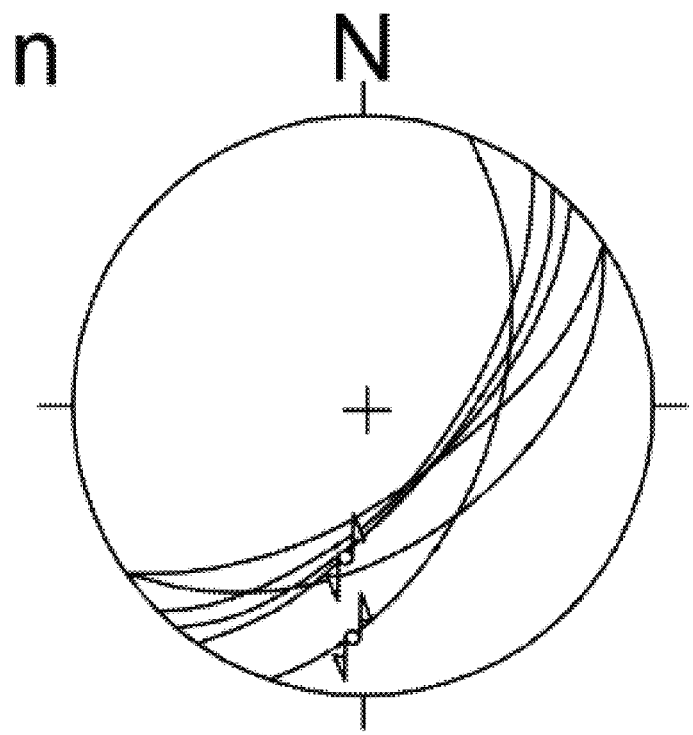
Figure 4O:
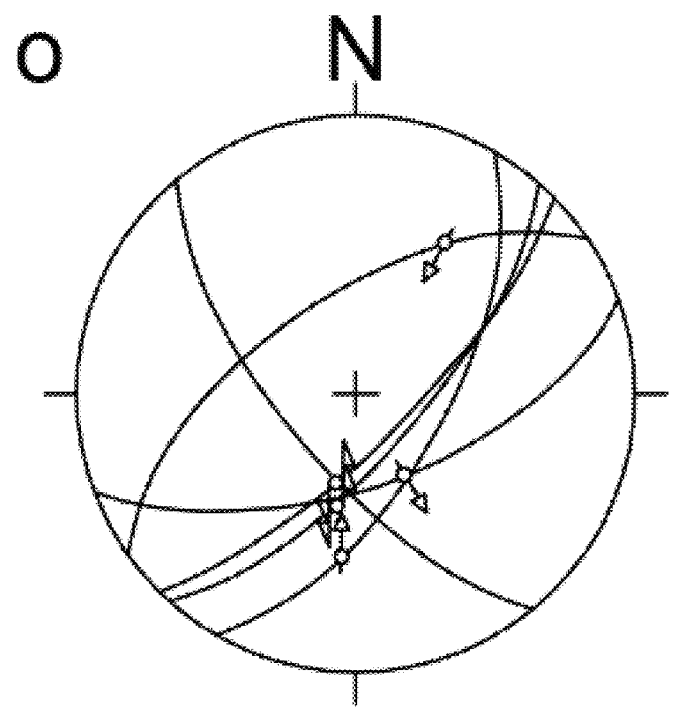
Figure 4P:
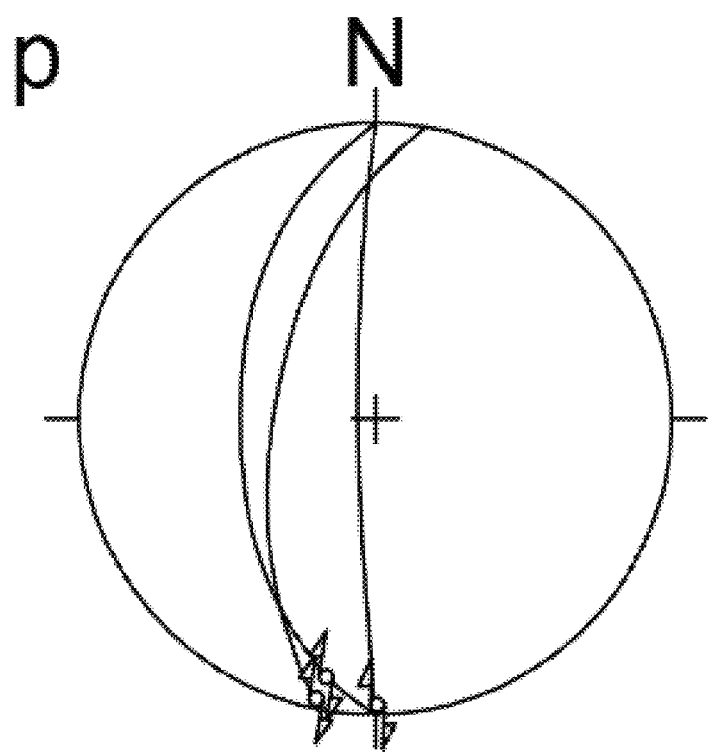
Figure 4Q:
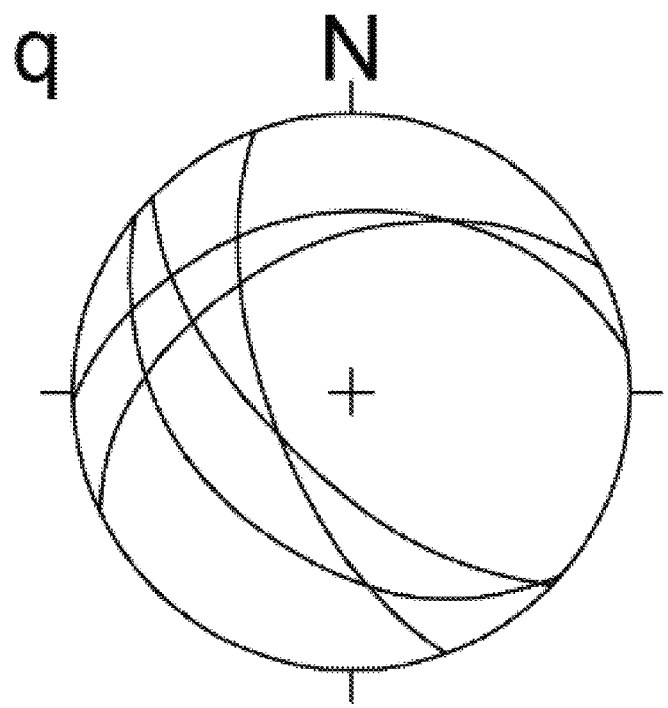
Figure 4R:
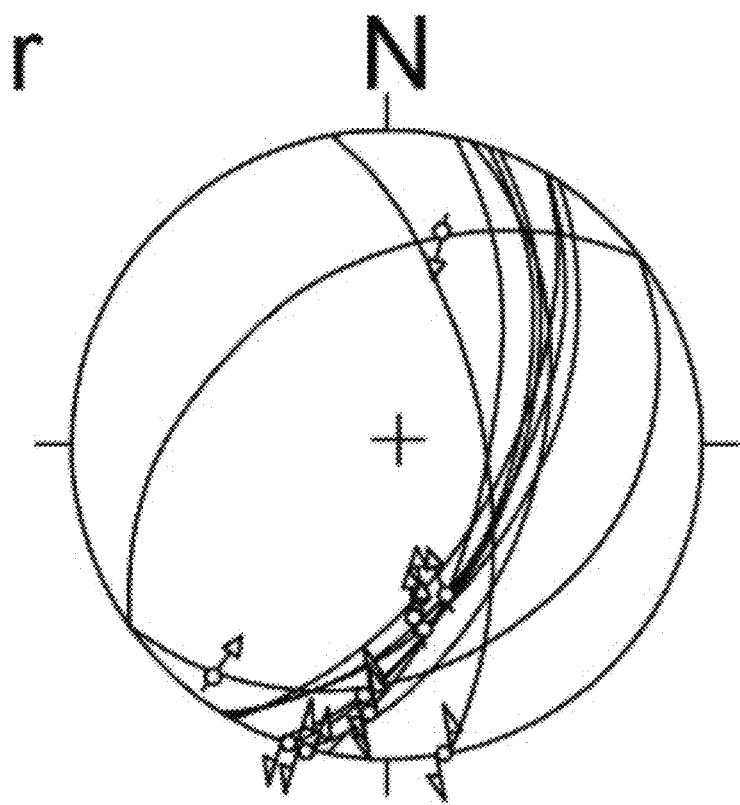
Figure 4S:
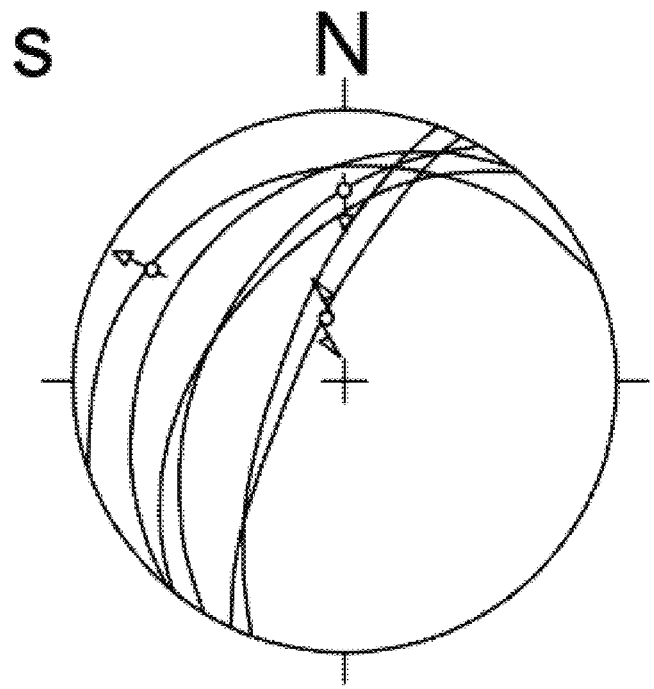
Figure 4T:
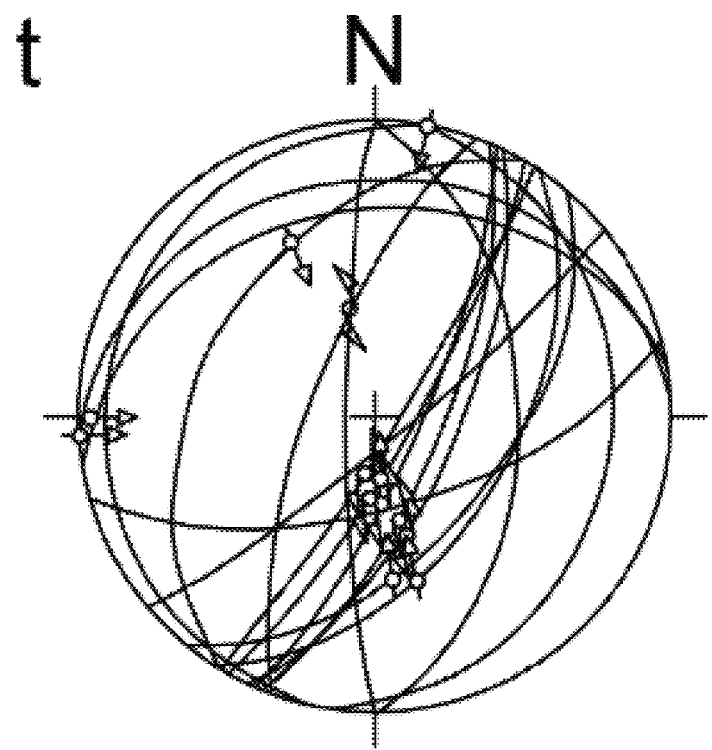
Figure 5A:
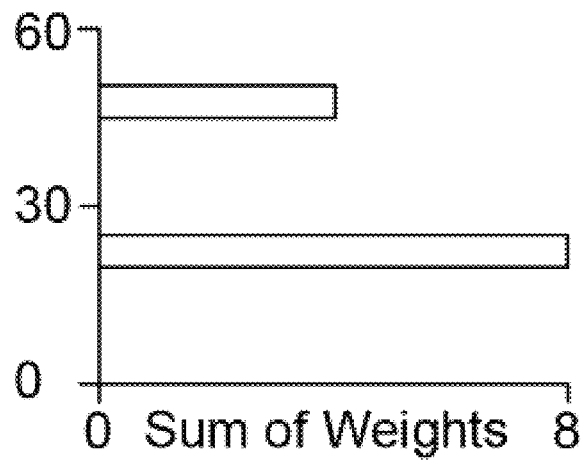
FIGS. 5A-5T illustrate measurement results of local principal compressive stresses at different locations of an anticline of a Pb—Zn deposit in eastern Yunnan, where
Figure 5B:
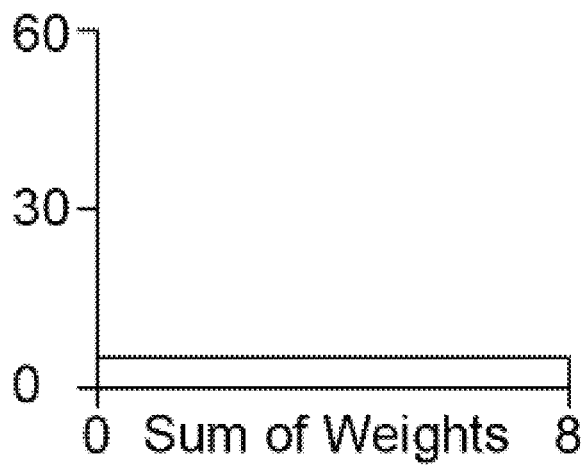
Figure 5C:
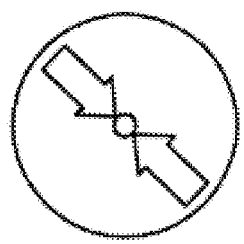
Figure 5C:
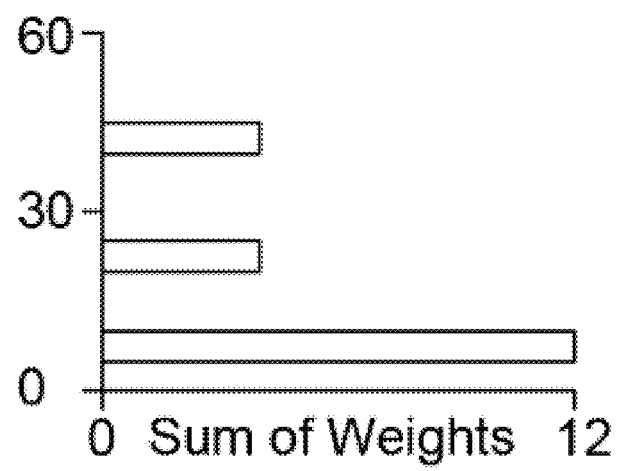
Figure 5D:
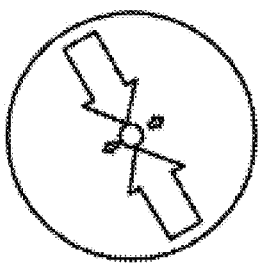
Figure 5D:
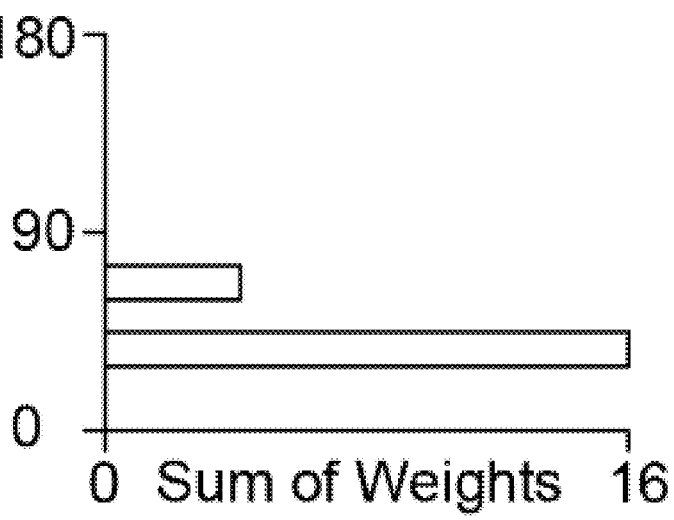
Figure 5E:
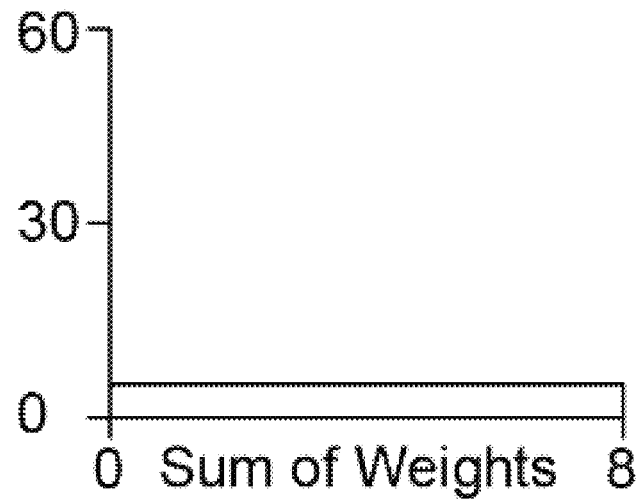
Figure 5F:
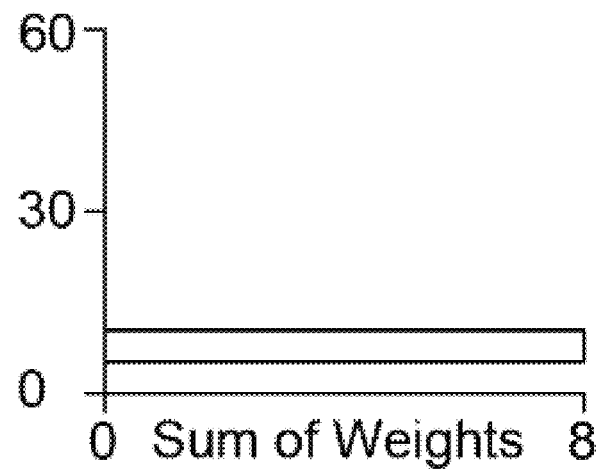
Figure 5G:
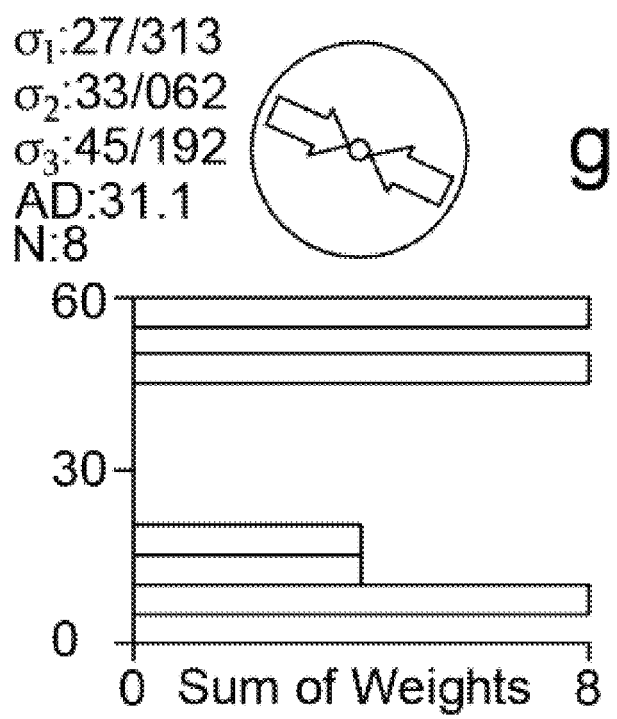
Figure 5H:
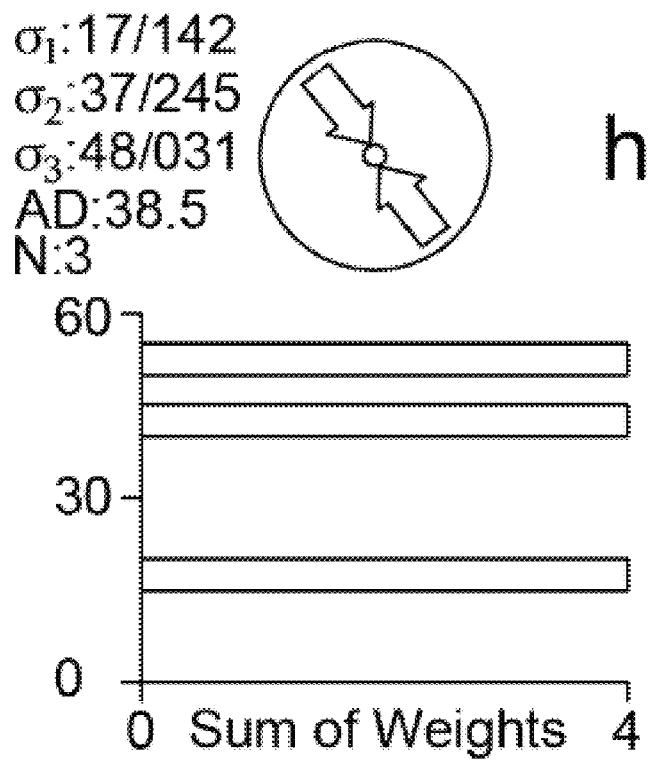
Figure 5I:
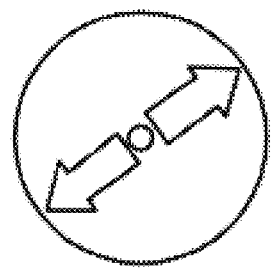
Figure 5I:
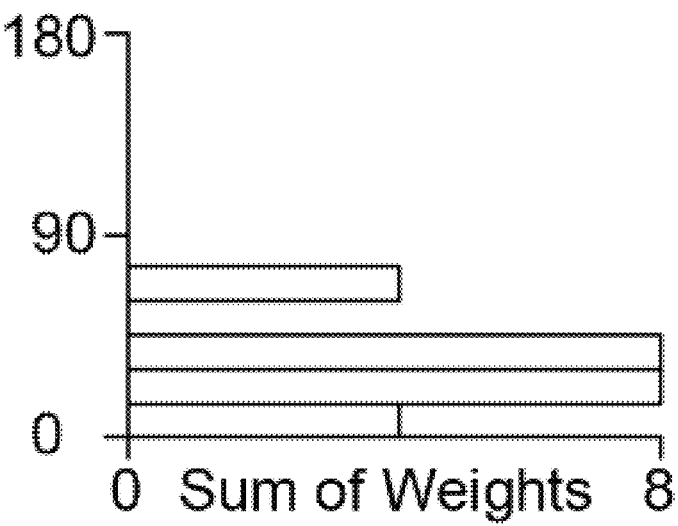
Figure 5J:
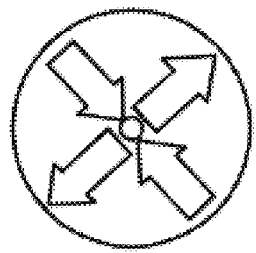
Figure 5J:
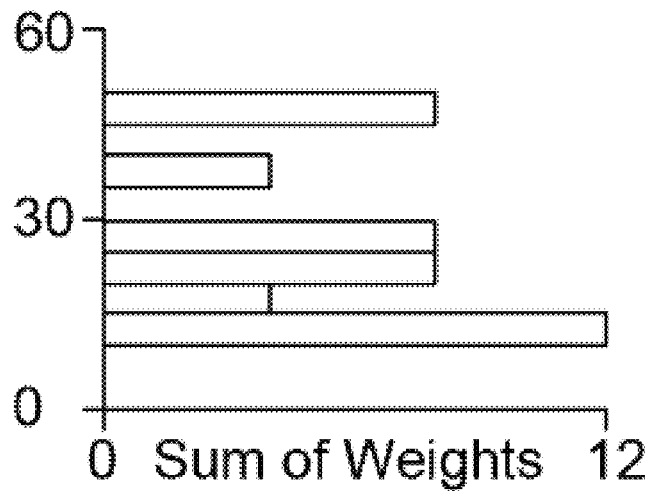
Figure 5K:
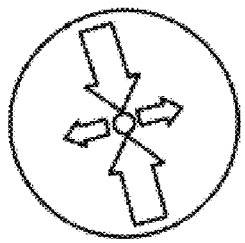
Figure 5K:
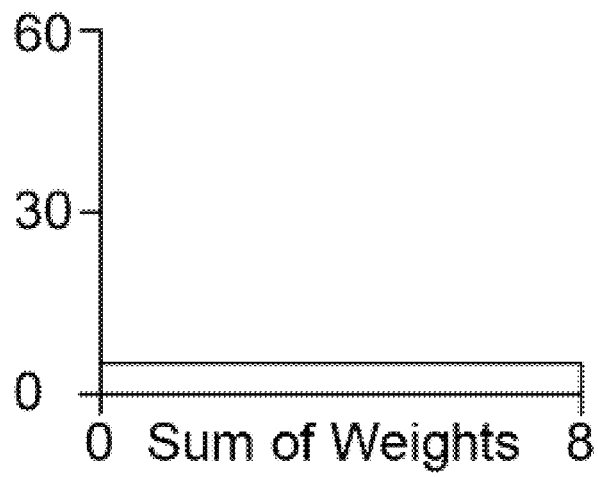
Figure 5L:
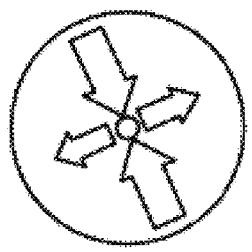
Figure 5L:
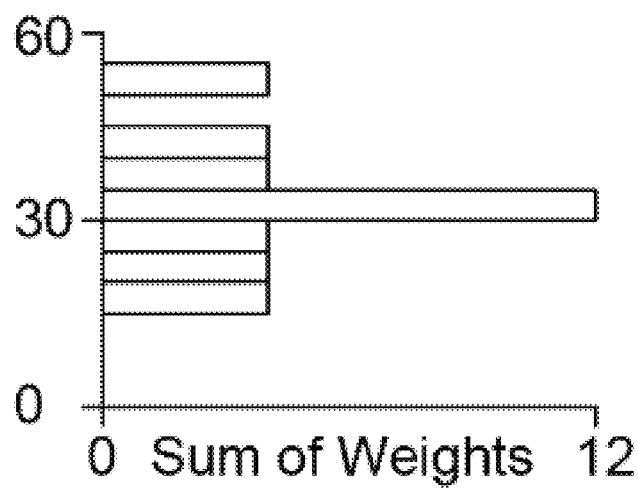
Figure 5M:
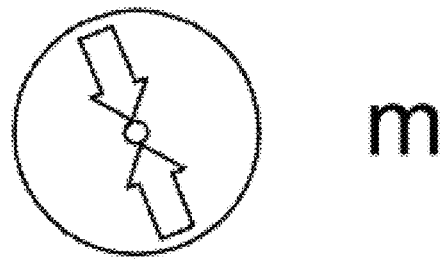
Figure 5M:
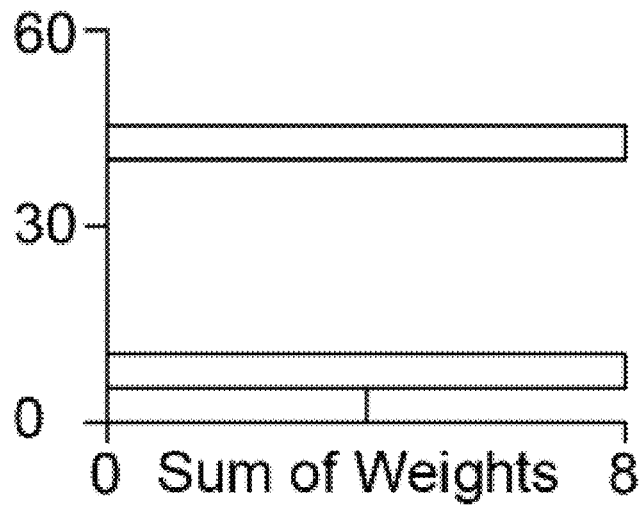
Figure 5N:
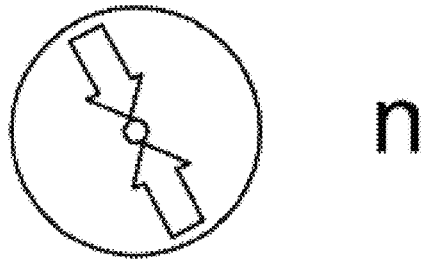
Figure 5N:
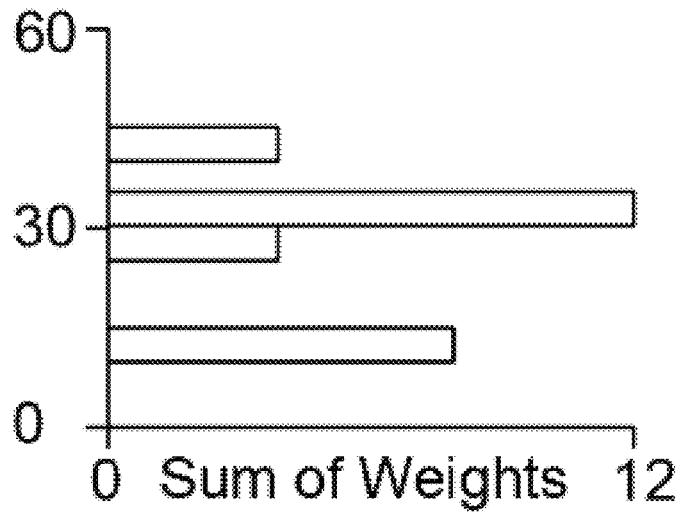
Figure 5O:
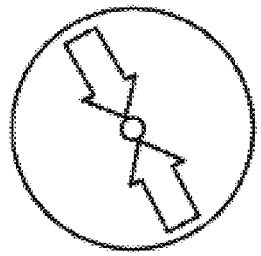
Figure 5O:
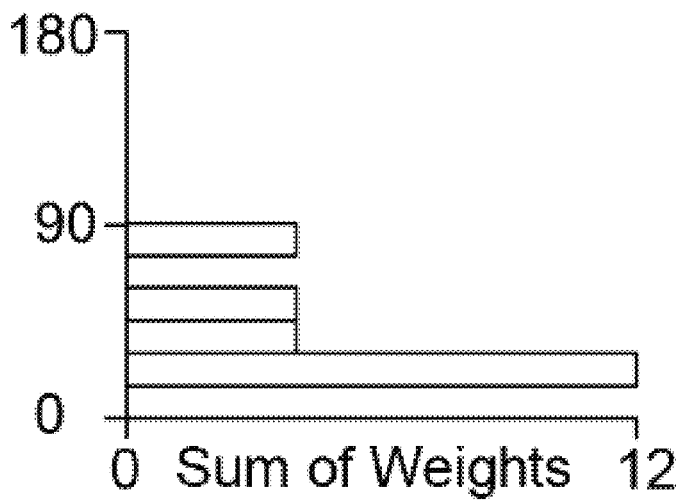
Figure 5P:
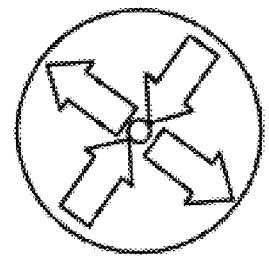
Figure 5P:
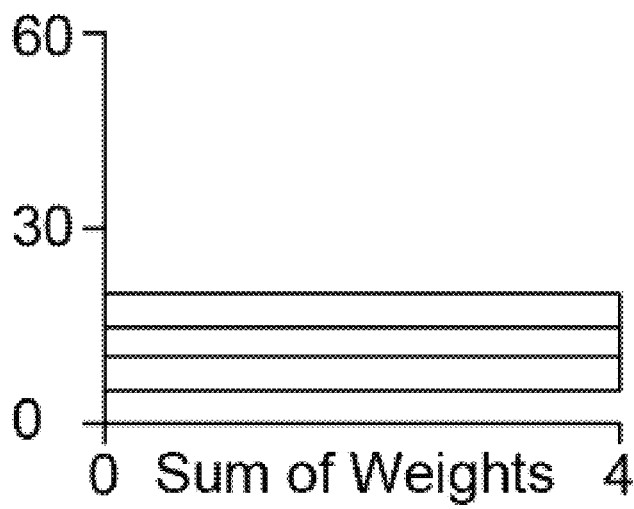
Figure 5Q:
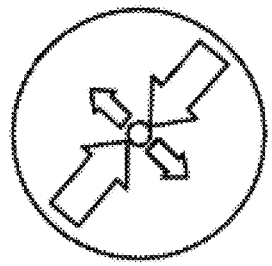
Figure 5Q:
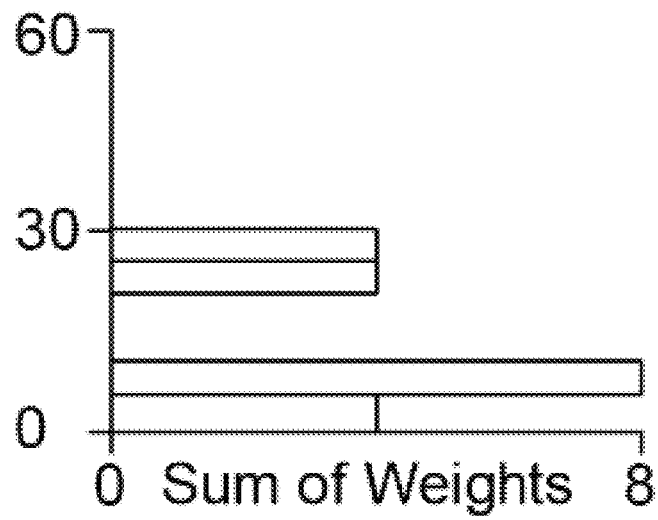
Figure 5R:
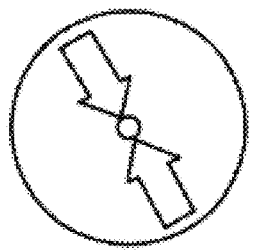
Figure 5R:
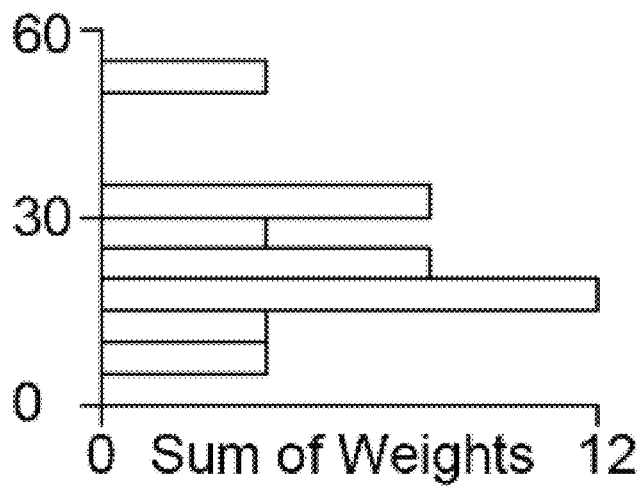
Figure 5S:
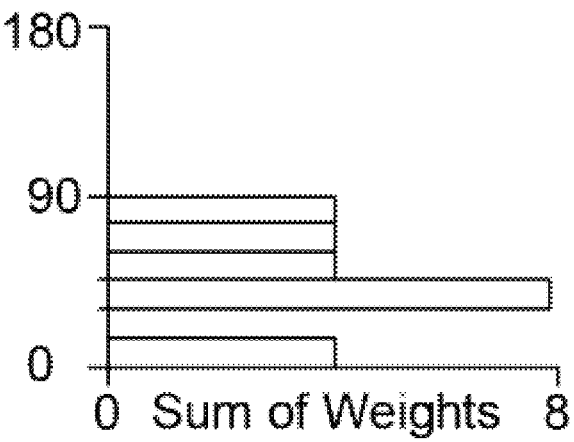
Figure 5T:
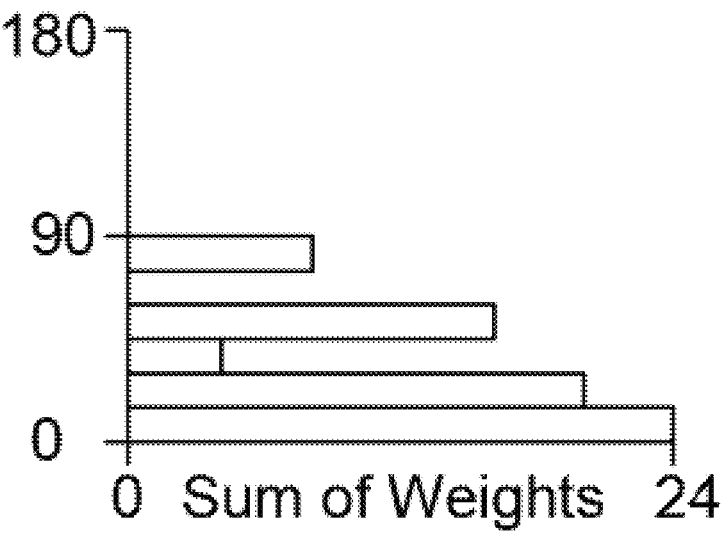
Figure 6:
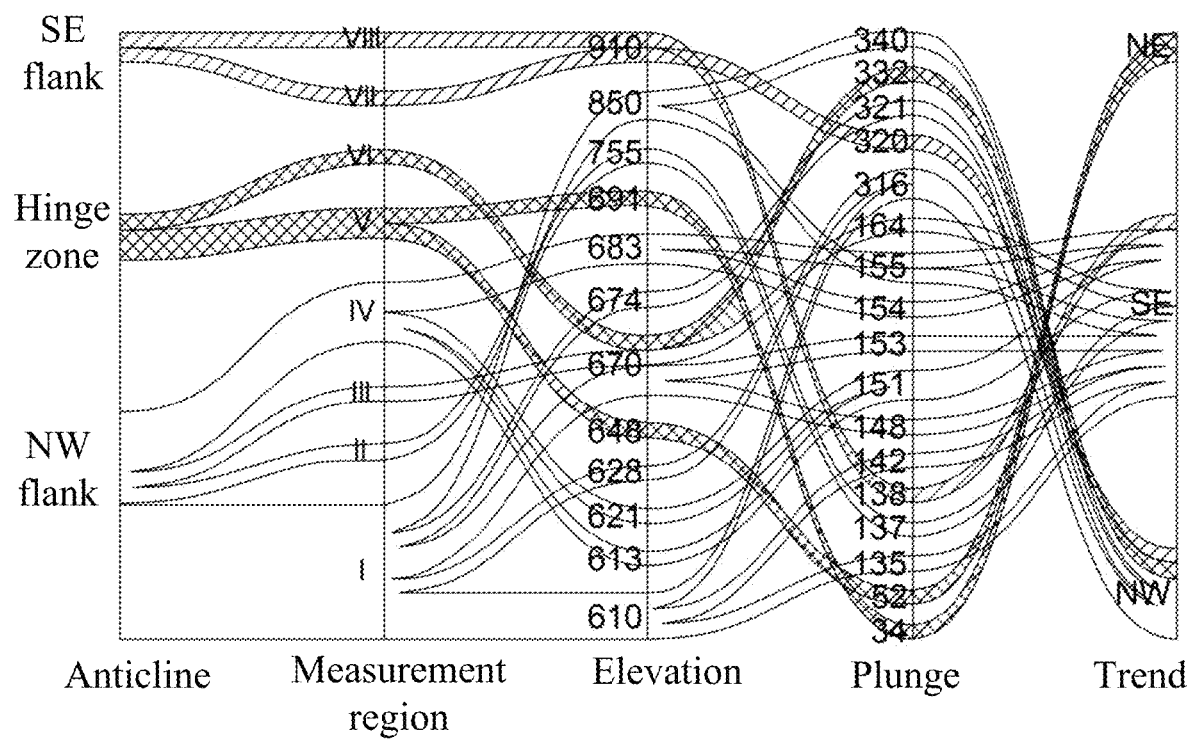
FIG. 6 illustrates a planar trend and plunge distribution of local principal compressive stresses at different locations of an anticline of a Pb—Zn deposit in eastern Yunnan.

3. Analysis on Directions of Principal Compressive Stresses for the Ore-Forming Structures of the Mining Area With the Theory and Method of Orefield Geomechanics, ore-forming structures at different locations and different elevations (FIG. 3) of the anticline in the deposit and ore-controlling characteristics of the ore-forming structures are analyzed systematically. On the basis of regional geological setting, in combination with mechanical information, kinematic information, a tectonite and mineralization distribution, a spatial orebody distribution, ore-forming elements and the like of the structures, the ore-forming structures are determined, and related information is organized systematically. Upon this, Win Tensor software (Delvaux and Sperner, 2003) is used to perform local principal compressive stress analysis, with results shown in FIGS. 4-6. Through fine analysis, at different locations of the anticline, local principal compressive stresses $\sigma_1$ trend NW (316°-340°), SE (135°-164°), and NE (34°-52°), with a plunge of 0-35°. Specifically, (1) According to analysis on the ore-hosting structure at the NW flank of the anticline, local principal compressive stresses $\sigma_1$ have a trend of 135°-164°. The No. I measurement region changes a lot, with a trend decreased as a decrease of the elevation, namely transitioned from NNW-SSE to NWW-SEE (160°-135°). The No. II measurement region changes a little, with a NW-SE (151°-155°) trend. The No. VI measurement region shows a NW-SE (152°-158°) trend. Vertically, for the No. I measurement region at the NW flank of the anticline, the trend of the local principal compressive stress $\sigma_1$ changes a lot, and the NW trend and the SE trend appear alternately (FIG. 6). For the No. II measurement region, the No. III measurement region, and the No. IV measurement region, the local principal compressive stress $\sigma_1$ trends SE. For the No. I measurement region, the plunge changes a lot, and the small plunge and the large plunge appear alternately with the elevation, and are 10°-35°. The No. II measurement region and the No. III measurement region generally have small plunges, which are 0° and 8° respectively. The plunge of the No. IV measurement region is decreased with the decrease of the elevation, and is 19°-30° and 2°. (2) According to analysis on the ore-hosting structure at the hinge zone of the anticline, local principal compressive stresses $\sigma_1$ have two trends. The local principal compressive stress of the No. V measurement region trends NE-SW (34°-52°). The local principal compressive stress of the No. VI measurement region trends NW-SE (332°). Vertically, the local principal compressive stress $\sigma_1$ of the No. V measurement region trends NE, and the local principal compressive stress of the No. VI measurement region trends NW. The plunge of the No. V measurement region is increased with the decrease of the elevation. The No. VI measurement region has both a low plunge (7°) and a high plunge (15°). (3) At the SE flank of the anticline, the local planar principal compressive stress $\sigma_1$ of the No. VII measurement region and the local planar principal compressive stress of the No. VIII measurement region trend NW-SE (138°-140°), and trend NW and SE vertically. The plunge of the No. VII measurement region and the plunge of the No. VIII measurement region are high, and are respectively 32° and 21°.

In combination with regional tectonic evolution and the local principal compressive stress analysis, it is determined that an overall principal compressive stress $\sigma_1$ of the mining area trends NW-SE. Based on analysis on the ore-controlling structures of the deposit, the anticline is an overturned anticline with an NE trend, in which the principal compressive stress $\sigma_1$ trends SE. Because of an "S-shaped" axode or an "inverted S-shaped" axode of the anticline, a shearing effect occurs on the anticline. This indicates that there is no standard vertical extrusion between the direction of the principal compressive stress $\sigma_1$ of the mining area and the axode in plane. In combination with the local principal compressive stress analysis, it is inferred that the occurrence of the overall principal compressive stress $\sigma_1$ of the mining area is 135°-145°/0-35° (trend/plunge) (FIG. 1).

Figure 7A:
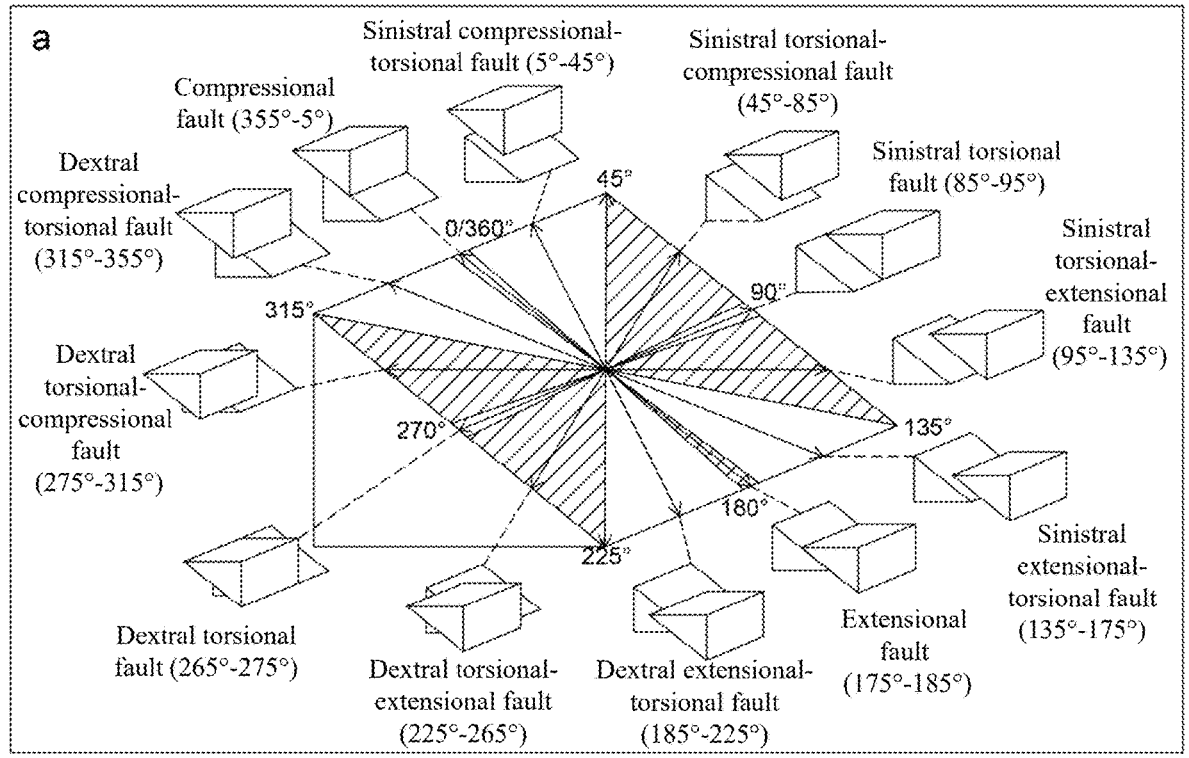
FIGS. 7A-7D are schematic views of geomechanical characteristics, where

4. Analysis of a Control Effect of the Local Principal Compressive Stresses on Formation of an Ore-Bearing Space and a Spatial Distribution of Orebody Groups From a kinematic angle of the fault, a mechanical mechanism and stress field characteristics of the structure cannot be analyzed accurately. For the sake of in-depth discussion on ore-controlling characteristics of the fault structure, a concept of structural sequence transformation in the Theory and Method of Orefield Geomechanics (Li Siguang, 1979a-b; Sun Jiacong and Han Runsheng, 2016) is introduced. The lower-order structural trace may be generated newly, and may also be transformed from mechanical properties of an old high-order structural trace. For the sequence transformation under a same tectonic force, sequence transformation structural planes are obtained (Sun Jiacong and Hanrunsheng, 2016). Under the continuous action of the external force, the rock mass (body) is distorted gradually to cause deformation. The structural plane of the rock mass is deviated from an initial direction to different degrees, and also deviated from the corresponding stress trajectory. Consequently, mechanical properties of the rock mass change, and the single structural plane is transformed into sequence transformation structural planes (FIG. 7A).

Hence, structural types of the single structural plane and the sequence transformation structural planes must be divided according to mechanical properties of the fault. The single structural plane includes a compressional (C) fault, an extensional (T) fault, and a shear fault ($S_1$ and $S_2$). Under the continuous shearing action of a tectonic stress, fault structures in different directions show complex mechanical properties, namely the sequence transformation structural planes, such as a compressional-torsional (c) structural plane, a torsional-compressional ($s_2$) structural plane, a torsional-extensional (t) structural plane, and an extensional-torsional ($s_1$) structural plane (FIG. 7D). Hence, in stress analysis, the stress unit body is used to analyze a corresponding relationship with a stress ellipsoid (FIG. 7C). In addition, mechanical properties of the structure in the brittle deformation domain are associated with a relative angle between the hanging wall and the footwall (FIGS. 7A-7D) in movement. The corresponding relationship is based on a consensus: For most areas, in the brittle deformation domain, an acute included angle between the direction of the principal compressive stress $\sigma_1$ and the conjugated fault (joint) is less than 45° for an internal friction angle φ of the rock.

Figure 7B:
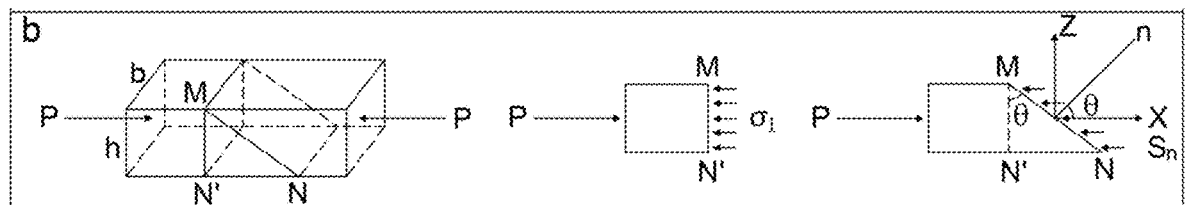
Figure 7C:
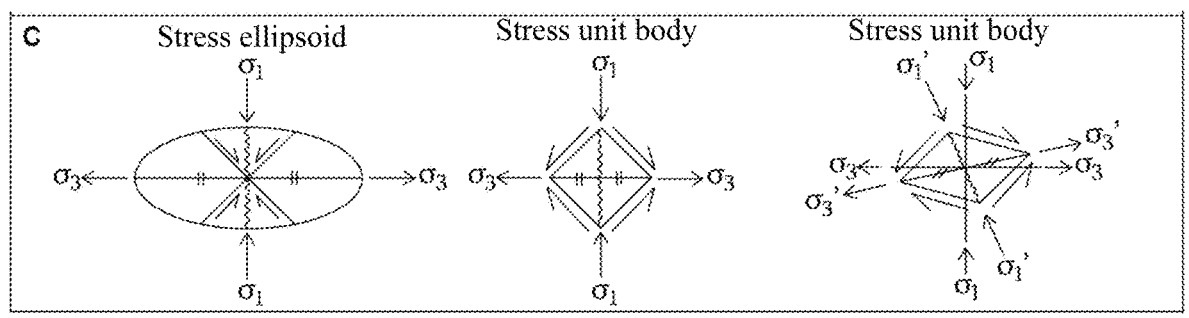
Figure 7D:
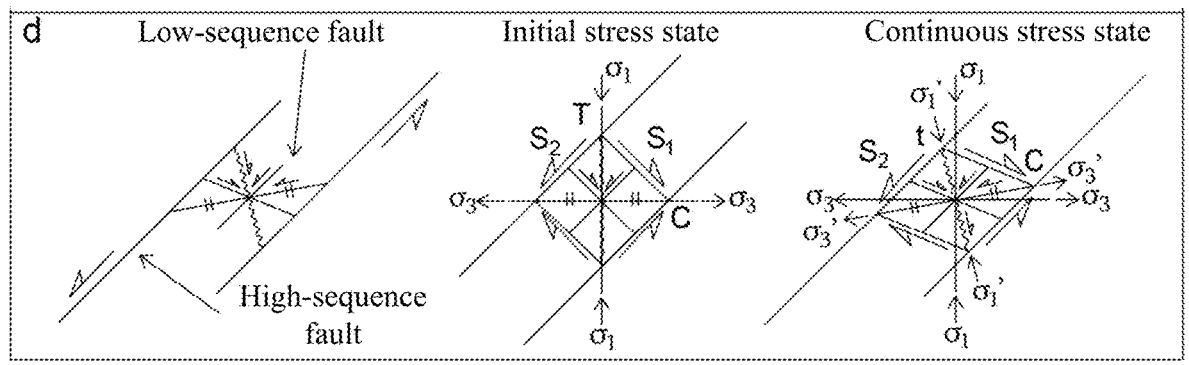

Under an action of the single principal compressive stress, the analysis of the stress state on any section is as shown in FIG. 7B. The plane and the profile are analyzed in a similar way. The oblique section MN of the cylinder is obtained. There is an angle θ between the normal n of the oblique section and the axis of the cylinder (it is specified that from the axis, the angle θ in the counter-clockwise direction is positive). The cylinder has a width of b, and a height of h. If the normal section MN' has an area of A'=b·h, the oblique section MN has an area of A=b·(h/cos θ)=A'/cos θ. According to equilibrium conditions, if the additional internal force applied to the section MN is P, the stress applied to the section MN is:

$$S_n = P/A'/\cos\theta = \sigma_1 \cos\theta. \quad (1)$$

Hence, P/A'=$\sigma_1$. Eq. (1) represents a relationship between the stress $S_n$ on the oblique section MN and the principal compressive stress $\sigma_1$. As can be seen, with the increase of the angle θ of the oblique section, the stress $S_n$ is decreased. For example, if the angle θ is increased to 90°, namely the section is parallel to the X-axis, the stress $S_n$ is decreased to 0. This indicates that no stress is applied to the section parallel to the external force P.

For ease of mechanical analysis on the problem, the stress $S_n$ on the oblique section can further be decomposed into a stress component perpendicular to the section and a stress component parallel to the section, namely a normal stress ($\sigma_n$) and a torsional stress ($\tau_n$):

$$\sigma_n = S_n \cdot \cos\theta = \sigma_1 \cos^2\theta. \quad (2)$$

$$\tau_n = S_n \cdot \sin\theta = \sigma_1 \cos\theta \cdot \sin\theta. \quad (3)$$

With equations of trigonometric functions, cos 2θ=2 $\cos^2\theta$−1, sin 2θ=2 sin θ·cos θ, then $$\sigma_n = \sigma_1/2 + \sigma_1/2\cos 2\theta. \quad (4)$$

$$\tau_n = \sigma_1/2 \sin 2\theta. \quad (5)$$

According to Eq. (4) to Eq. (5), the stress state on the section with any included angle θ between the normal n and the X-axis can be obtained.

Figure 8:
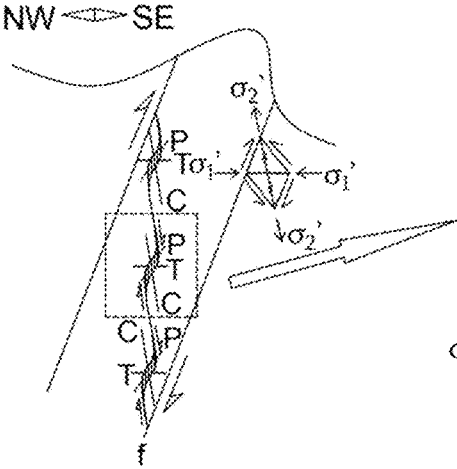
FIG. 8 illustrates mechanical mechanisms of trends of local principal compressive stresses at different locations of an anticline of a Pb—Zn deposit in eastern Yunnan, where an upper figure illustrates an NW trend of an interlayer fault at an NW flank of the anticline, a middle figure illustrates an SE trend of the interlayer fault at the NW flank of the anticline, and a lower figure illustrates an SE trend of an interlayer fault at an SE flank of the anticline, 1: known orebody, 2: mineralized body, and 3: ore-forming fluid.
Figure 8:
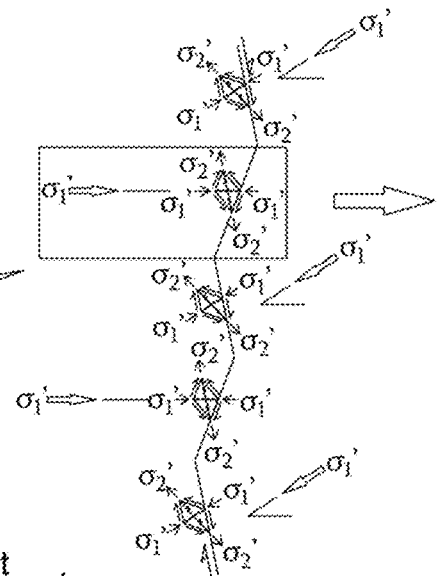
Figure 8:
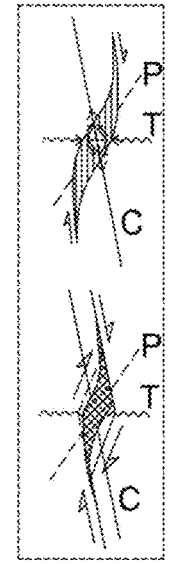
Figure 8:
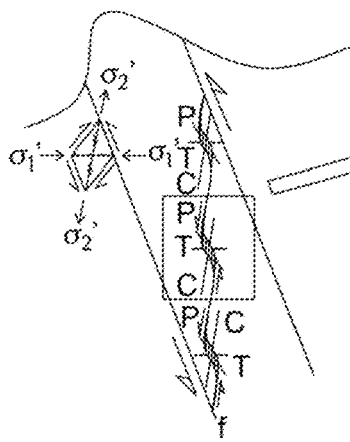
Figure 8:
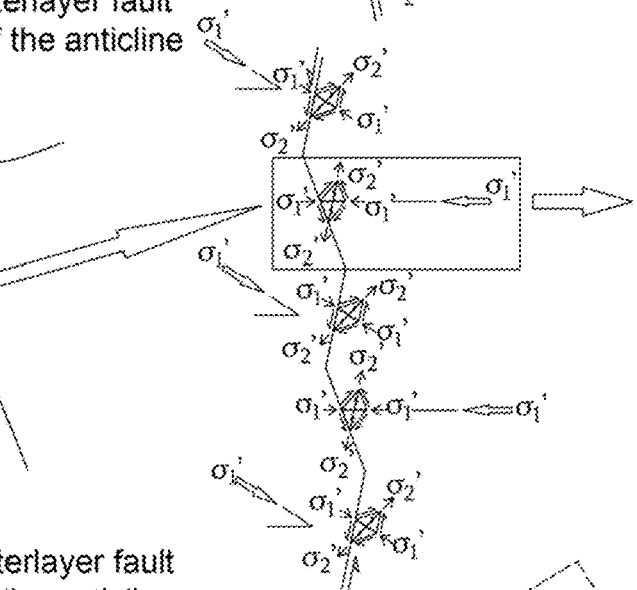
Figure 8:
Figure 8:
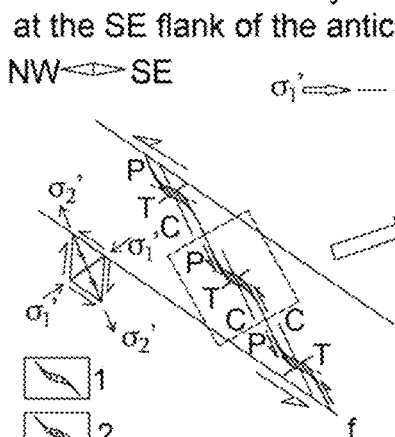
Figure 8:
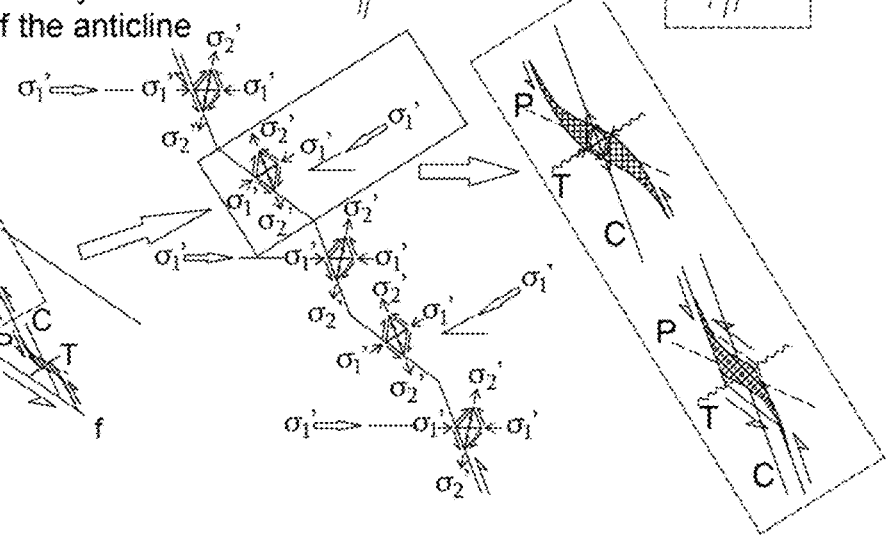

For the ore-bearing interlayer fault structure, when the interlayer fault changes from a steep NW dip to a gentle NW dip to the steep NW dip, the local principal compressive stress $\sigma_1$ trends NW-SE (or NE, provided that the plunge is decreased)-NW. When the interlayer fault changes from a steep SE dip to a gentle SE dip to the steep SE dip, the local principal compressive stress $\sigma_1$ trends SE-NW (or SE, provided that the plunge is decreased)-SE. The orebodies controlled by the compressional-torsional fault are "gentle-wide and narrow-steep" (FIG. 8).

Figure 9A:
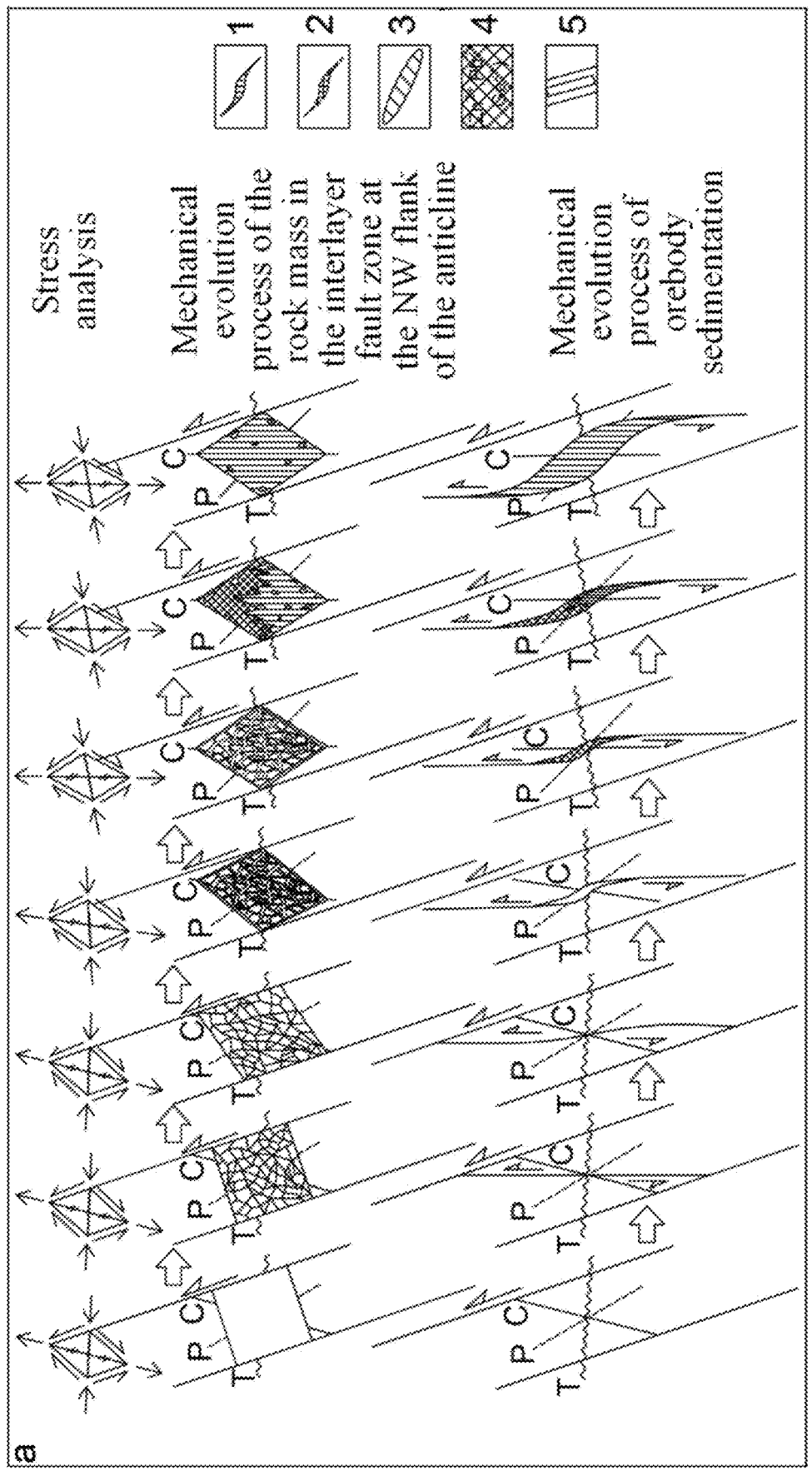
FIGS. 9A-9B illustrate profile views in genetic evolution of an ore-controlling mechanical mechanism of a Pb—Zn deposit in eastern Yunnan and a relationship of the ore-controlling mechanical mechanism, where
Figure 9B:
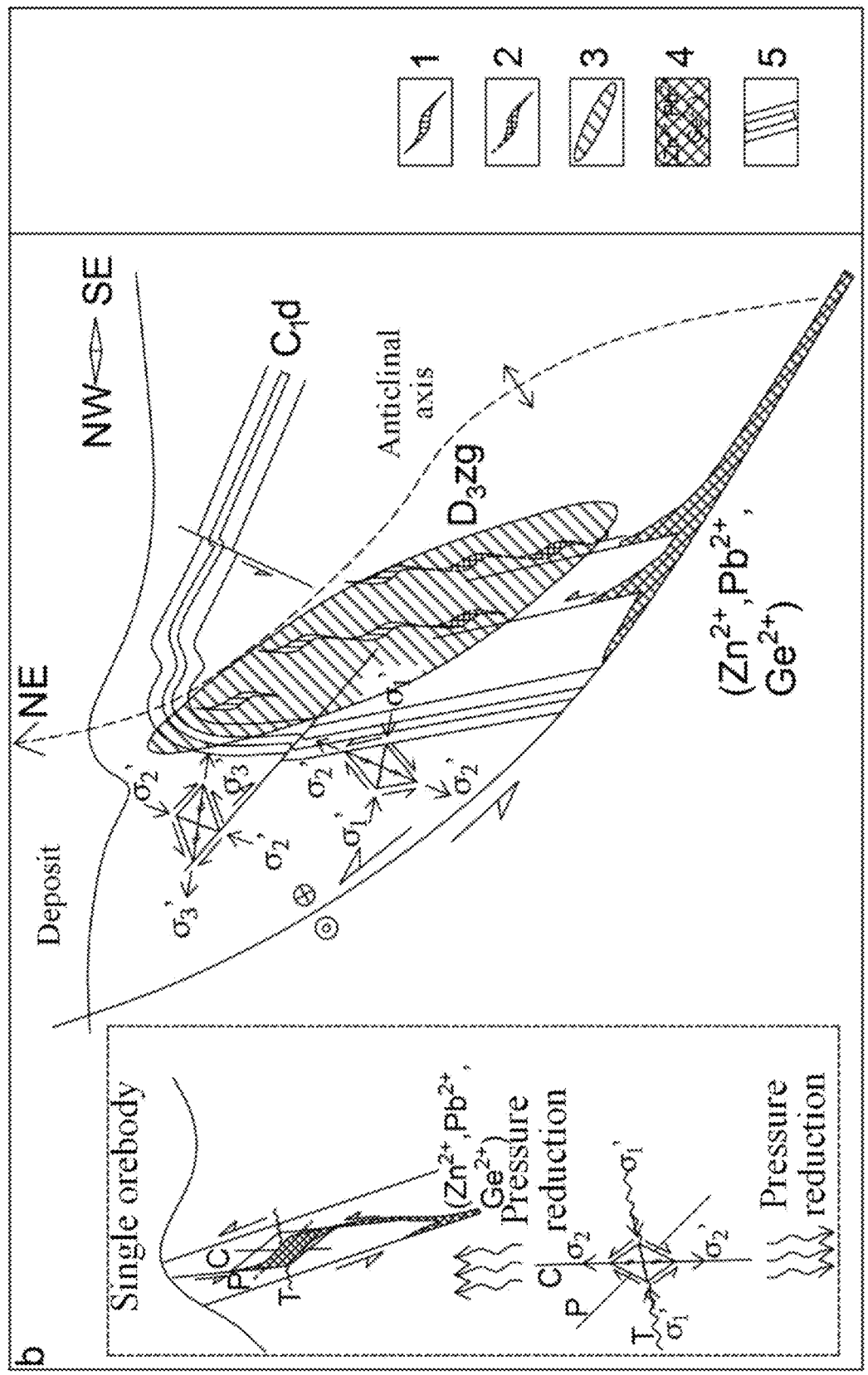

5. Analysis on Different Ore-Forming Rules at Different Locations of the Anticline and Control Mechanisms The compressional-torsional fault can cause rock breakage to form a broken space. The opening space formed at the occurrence changed location of the fault zone, namely at a relative gentle position of the fracture, is a favorable space for fluid replacement and infiltration. At the favorable tectonic location, precipitation is performed to form the ores (FIGS. 9A-9B).

When local principal compressive stresses at the two flanks have a same direction, the stratum at the NW flank has a large dip, with the compressional-torsional plane C used mainly for resisting the compression, followed by the shear. The stratum at the SE flank has a small dip, with the compressional-torsional plane C used mainly for resisting the shear, followed by the tension. In response to a relative slip, the interlayer fault suffers not only the principal compressive stress, but also the gravity of the rock or the land mass.

Assuming that the force parallel to the long axis P of the orebody is $F_P$=mg cos γ−$\sigma_1$ cos α. (8)

(mg is a gravity, γ is an included angle between the direction of the gravity and the direction of the long axis P, and α is an included angle between the direction of the local principal compressive stress $\sigma_1$ and the direction of the long axis P).

If $F_P$<0, an upward relative movement parallel to the long axis P of the orebody occurs.

The included angle between the direction of the gravity and the direction of the long axis P:

$$\gamma_{NW} < \gamma_{SE}. \quad (9)$$

A component force of the gravity parallel to the direction of the long axis P:

$$mg\cos\gamma_{NW} > mg\cos\gamma_{SE}. \quad (10)$$

The included angle between the direction of the local principal compressive stress $\sigma_1$ and the direction of the long axis P:

$$\alpha_{NW} = \alpha_{SE}. \tag{11}$$

A component force in the direction of the local principal compressive stress $\sigma_1$ and in the direction of the long axis P:

$$\sigma_1 \cos\alpha_{NW} = \sigma_1 \cos\alpha_{SE}. \tag{12}$$

According to Eq. (9) to Eq. (12), the SE flank meets the conditions of $F_P<0$ more easily than the NW flank to cause the upward relative movement parallel to the long axis P of the orebody.

It is known that both the interlayer fault at the NW flank and the interlayer fault at the SE flank show the relative movement. Concerning the lithology in the same stratum, the compressive capacity is generally greater than the shear capacity, and thus the shear deformation occurs more easily. Hence, the SE flank shows the relative slip as long as the $F_P$ reaches the minimum force required by the shear capacity, thereby forming the compressional-torsional fault, and releasing the stress. The $F_P$ at the NW flank reaches not only the minimum force required by the shear capacity, but also the minimum force required by the compressive capacity of the rock. The NW flank not only shows the relative slip, but also damages the rock to form the opening space. Therefore, different dips of the interlayer faults correspond to different time of the stress for damaging the rock and different intensities, resulting in different ore-forming rules at the NW flank and the SE flank. This is one of the reasons why the orebodies are formed at the NW flank, but no obvious orebodies are seen at the SE flank.

6. Analysis on a Favorable Zone of the Deposit and Target Delineation of a Concealed Orebody For the anticline, the local principal compressive stress $\sigma_1$ at the hinge zone extrudes to NE-SW, and the local principal compressive stress $\sigma_1$ at the NW flank extrudes to NW-SE. There is a stress transformation region (FIGS. 9A-9B) between the hinge zone and the NW flank. In the favor ore-forming region, when the interlayer fault for controlling the orebodies has a gentle dip, the direction of the local principal compressive stress is reversed or the plunge is decreased. This region is the stress transformation region where the orebodies are located, a favorable occurrence location of the orebodies and the mineralized bodies, and a target position of the concealed orebodies (FIGS. 9A-9B). Therefore, the stress transformation region is considered as a favorable space for precipitating such minerals as Pb, Zn and germanium, as well as a deep prospecting target.

The position of the concealed orebodies predicted with the method is generally in good agreement with the verification result in the drilling engineering. Therefore, the method is feasible.

What is claimed is:

1. A target delineation method for deep prospecting of a hydrothermal deposit controlled by a fault-fold structure, comprising the following steps:
   (1): based on a theory and method of geomechanics, through structure measurement in plane and in profile, analyzing space geometric, kinematic, mechanical, materiality, chronological, and dynamic characteristics of the fault-fold structure for controlling a mineralization zone in a mining area, and identifying types of ore-forming structures in the mining area; and analyzing spatial distribution characteristics of orebodies or mineralized bodies, analyzing and finding a structural hierarchal ore-controlling pattern in each of a deposit scale, an orebody scale, and an ore vein scale, determining an ore-controlling structure association style, dividing an ore-controlling tectonic system of the mining area, and constructing an ore-controlling pattern of the fault-fold structure;
   (2): based on the ore-controlling pattern of the fault-fold structure in the step (1), and a revealed echelon distribution of known orebodies or mineralized bodies, analyzing a local stress field for controlling an ore-controlling structure of each of a single orebody and a single orebody group, thereby analyzing a mechanical mechanism of the ore-forming structure;
   (3): systematically classifying the ore-forming structures in the step (1) according to different locations and different elevations of an anticline, performing local principal compressive stress analysis with stress analysis software, and determining a trend and a plunge of a local principal compressive stress of an ore-controlling structure; and based on the ore-controlling pattern of the fault-fold structure, and in combination with regional tectonic evolution and the local principal compressive stress analysis, determining a trend and a plunge of an overall principal compressive stress of the mining area;
   (4): based on a principle of structural sequence transformation in the theory and method of geomechanics, and the mechanical mechanism of the ore-forming structure in the step (2), and in combination with an analysis result and a change rule of the trend and the plunge of the local principal compressive stress in the step (3), analyzing mechanical properties of the ore-forming structure and a secondary structural plane of the ore-forming structure in profile by using a stress unit body, thereby revealing a control effect of the local principal compressive stress on formation of an ore-bearing space and on a spatial distribution of orebody groups;
   (5): based on an analysis result and a change rule of the trend and the plunge of the overall principal compressive stress, and the analysis result and the change rule of the trend and the plunge of the local principal compressive stress in the step (3), and the mechanical properties of the ore-forming structure and the secondary structural plane of the ore-forming structure in the profile in the step (4), and in combination with an occurrence of the ore-forming structure, analyzing different ore-forming rules at different locations of the anticline and control mechanisms of the different ore-forming rules; and
   (6): in combination with the control effect of the local principal compressive stress on the formation of the ore-bearing space and on the spatial distribution of the orebody groups in the step (4), and the different ore-forming rules at the different locations of the anticline and the control mechanisms of the different ore-forming rules in the step (5), further revealing a mechanical mechanism of an ore-controlling structure at a favorable ore-forming location, determining a stress transformation region controlled by a deposit structure as a favorable ore-forming zone of the deposit, and finding a region with an opposite direction of the local principal compressive stress and a decreased plunge, when a dip of an interlayer fault for controlling an orebody distribution becomes gentle, as a stress transformation region controlled by an orebody structure in the favorable ore-forming zone, wherein the stress transformation region controlled by the orebody structure is a target position for concealed orebodies;

wherein the stress transformation region of the deposit in the step (6) is determined as follows:

in profile, an anticlinal flank of the fault-fold structure is a relative stress compressing region, a hinge zone above a neutral plane is a stress extending region, and the stress transformation region is located between the relative stress compressing region and the stress extending region.

2. The target delineation method for deep prospecting of a hydrothermal deposit controlled by a fault-fold structure according to claim 1, wherein the spatial distribution characteristics of the orebodies comprise an ore-bearing horizon, a spatial orientation, and an occurrence; and the occurrence comprises a strike, a dip direction, a dip, and a pitch.

3. The target delineation method for deep prospecting of a hydrothermal deposit controlled by a fault-fold structure according to claim 1, wherein the echelon distribution of the orebodies or the mineralized bodies in the step (2) is as follows:

orebodies in an orebody group scale are distributed in a left echelon in plane; and in profile, orebodies in a northwest (NW)-trending and a northeast (NE)-southwest (SW)-striking sinistral torsional-compressional ore-bearing fault are distributed in a left lateral echelon, and orebodies in a southeast (SE)-trending and the NE-SW-striking sinistral torsional-compressional ore-bearing fault are distributed in a right lateral echelon;

the orebodies in the orebody group scale are distributed in the left echelon in plane; and in profile, orebodies in a SW-trending and a NW-SE-striking sinistral torsional-compressional ore-bearing fault are distributed in a left lateral echelon, and orebodies in a NE-trending and the NW-SE-striking sinistral torsional-compressional ore-bearing fault are distributed in a right lateral echelon;

the orebodies in the orebody group scale are distributed in the left echelon; and in profile, orebodies in a north (N)-trending and an east (E)-west (W)-striking sinistral torsional-compressional ore-bearing fault are distributed in a left lateral echelon, and orebodies in a south(S)-trending and the E-W-striking sinistral torsional-compressional ore-bearing fault are distributed in a right lateral echelon; and the orebodies in the orebody group scale are distributed in the left echelon in plane; and in profile, orebodies in a W-trending and a S-N-striking sinistral torsional-compressional ore-bearing fault are distributed in a left lateral echelon, and orebodies in an E-trending and the S-N-striking sinistral torsional-compressional ore-bearing fault are distributed in a right lateral echelon; and the mechanical mechanism of the ore-forming structure is as follows:

the orebody is controlled by a compressional-torsional plane in plane and in profile;

a long axis of the orebody is controlled by the compressional-torsional plane in plane and in profile; and a long axis of the orebody group, specifically a series connection plane of the orebodies, is controlled by the compressional-torsional plane in plane and in profile.

* * * * *